United States Patent
Ikemoto et al.

(10) Patent No.: US 11,682,009 B2
(45) Date of Patent: Jun. 20, 2023

(54) RESOURCE ACCOMMODATION ASSISTANCE SYSTEM, RESOURCE ACCOMMODATION ASSISTANCE METHOD, AND RESOURCE ACCOMMODATION ASSISTANCE APPARATUS

(71) Applicant: HITACHI, LTD., Tokyo (JP)

(72) Inventors: Yu Ikemoto, Tokyo (JP); Takashi Fukumoto, Tokyo (JP); Hirofumi Nagano, Tokyo (JP); Masayuki Oyamatsu, Tokyo (JP); Shohei Yamagata, Tokyo (JP)

(73) Assignee: HITACHI, LTD., Tokyo (JP)

( * ) Notice: Subject to any disclaimer, the term of this patent is extended or adjusted under 35 U.S.C. 154(b) by 148 days.

(21) Appl. No.: 17/252,297

(22) PCT Filed: Jul. 6, 2018

(86) PCT No.: PCT/JP2018/025706
§ 371 (c)(1),
(2) Date: Dec. 15, 2020

(87) PCT Pub. No.: WO2020/008623
PCT Pub. Date: Jan. 9, 2020

(65) Prior Publication Data
US 2021/0264414 A1   Aug. 26, 2021

(51) Int. Cl.
*G06Q 40/00*   (2023.01)
*G06Q 20/38*   (2012.01)
(Continued)

(52) U.S. Cl.
CPC ......... *G06Q 20/389* (2013.01); *G06Q 20/401* (2013.01); *G06Q 50/06* (2013.01)

(58) Field of Classification Search
CPC .... G06Q 20/389; G06Q 20/401; G06Q 50/06; G06Q 20/085; G06Q 20/145;
(Continued)

(56) References Cited

U.S. PATENT DOCUMENTS 10,305,833 B1 * 5/2019 Dennis ............... H04L 9/16
2013/0253973 A1   9/2013 Ishibashi
(Continued)

FOREIGN PATENT DOCUMENTS

CA   2956290 A1 *  8/2018
CN   107423945 A   12/2017
(Continued)

OTHER PUBLICATIONS

Peck et al: "Energy Trading for Fun and Profit Buy your neighbor's rooftop solar power or sell your own—it'll all be on a blockchain", IEEE Spectrum—vol. 54, Issue: 10, Oct. 2017 (Year: 2017).*
(Continued)

*Primary Examiner* — Edward J Baird
(74) *Attorney, Agent, or Firm* — Mattingly & Malur, PC

(57) ABSTRACT

A resource accommodation assistance system includes a plurality of information processing apparatuses each including: a storage unit configured to hold a distributed ledger storing transactions issued in accordance with events including power sale from an ordinary household to a retail electric utility, power purchase by a customer through the power sale, and commodity purchase by the ordinary household of a commodity from the customer with a payment token gained from the retail electric utility through the power sale; and an arithmetic unit configured, in the event of commodity purchase, to execute a smart contract, to carry out a transaction for payment on the commodity purchase using the payment token with a predetermined premium bearing by the customer, and to store, in the distributed ledger, the
(Continued)

transaction subjected to a predetermined process executed together with another information processing apparatus among the information processing apparatuses.

1 Claim, 20 Drawing Sheets

(51) Int. Cl.
*G06Q 20/40* (2012.01)
*G06Q 50/06* (2012.01)

(58) Field of Classification Search
CPC .... G06Q 20/308; G06Q 20/405; G06Q 30/06; Y04S 50/12; Y04S 50/10; G07F 15/008
See application file for complete search history.

(56) References Cited

U.S. PATENT DOCUMENTS

| | | |
|---|---|---|
| 2015/0309549 A1 | 10/2015 | Okabe |
| 2016/0284033 A1 | 9/2016 | Winand et al. |
| 2017/0358041 A1* | 12/2017 | Forbes, Jr .............. H04L 69/325 |
| 2018/0240201 A1 | 8/2018 | Eda et al. |
| 2019/0123580 A1* | 4/2019 | Bindea .............. H02J 13/00028 |
| 2019/0139159 A1* | 5/2019 | Sarker .................... G06Q 50/06 |
| 2021/0021131 A1* | 1/2021 | Hanayama .............. H02J 3/004 |

FOREIGN PATENT DOCUMENTS

| | | |
|---|---|---|
| CN | 107870996 A | 4/2018 |
| JP | 2005-284420 A | 10/2005 |
| JP | 2011-180791 A | 9/2011 |
| JP | 2011-227837 A | 11/2011 |
| JP | 2015-100264 A | 5/2015 |
| JP | 2015-211594 A | 11/2015 |
| JP | 2017-153274 A | 8/2017 |
| WO | WO-2018148732 A2 * | 8/2018 ......... G06Q 30/0601 |

OTHER PUBLICATIONS

International Search Report of PCT/JP2018/025706 dated Sep. 4, 2018.

Extended European Search Report received in corresponding European Application No. 18925218.2 dated Feb. 4, 2022.

* cited by examiner

FIG. 5

<SURPLUS POWER SALE INFORMATION> 51

| SALE ID | SOURCE OF POWER SALE | TARGET OF POWER SALE | POWER SALE DATE AND TIME | AMOUNT OF SOLD POWER (kw) |
|---|---|---|---|---|
| 00001 | A | 1 | 2017/03/11 ... | 200 |
| 00002 | B | 1 | 2017/03/15 ... | 100 |
| 00003 | C | 1 | 2017/03/16 ... | 100 |
| 00004 | D | 1 | 2017/03/16 ... | 100 |
| 00005 | E | 1 | 2017/03/19 ... | 100 |
| ... | ... | ... | ... | ... |

FIG. 6

<ISSUED POWER TOKEN INFORMATION> 52

| TOKEN ID | SALE ID | TARGET OF TOKEN ISSUE | SOURCE OF TOKEN ISSUE | DATE AND TIME OF TOKEN ISSUE | AMOUNT OF TOKEN (YEN) |
|---|---|---|---|---|---|
| t0001 | 00001 | A | 1 | 2017/03/11 | 100 |
| t0002 | 00002 | B | 1 | 2017/03/15 | 50 |
| t0003 | 00003 | C | 1 | 2017/03/16 | 50 |
| t0004 | 00004 | D | 1 | 2017/03/16 | 50 |
| t0005 | 00005 | E | 1 | 2017/03/19 | 50 |
| ... | ... | ... | ... | ... | ... |

FIG. 7

⟨COMMODITY EXCHANGE RATE INFORMATION⟩ 53

| CUSTOMER ID | RATE (PRICE OF COMMODITY : AMOUNT OF TOKEN) | ... |
|---|---|---|
| d0001 | 110:100 | ... |
| d0002 | 115:100 | ... |
| d0003 | 112:100 | ... |
| d0004 | 110:100 | ... |
| d0005 | 130:100 | ... |
| ... | ... | ... |

FIG. 8

⟨CAMPAIGN-DESTINED COMMODITY EXCHANGE RATE INFORMATION⟩ 54

| CAMPAIGN ID | TARGET TIME PERIOD | CUSTOMER ID | RATE α (PRICE OF PURCHASED POWER : AMOUNT OF TOKEN) | RATE β (PRICE OF COMMODITY : AMOUNT OF TOKEN) |
|---|---|---|---|---|
| c001 | 12:00–14:00 | d0001 | 100:105 | 115:100 |
| c002 | 10:00–11:00 | d0002 | 100:110 | 115:100 |
| c003 | 14:00–16:00 | d0003 | 100:107 | 112:100 |
| c004 | 18:00–20:00 | d0004 | 100:105 | 110:100 |
| c005 | 6:00–8:00 | d0005 | 100:125 | 130:100 |
| ... | ... | ... | ... | ... |

RESOURCE ACCOMMODATION ASSISTANCE SYSTEM, RESOURCE ACCOMMODATION ASSISTANCE METHOD, AND RESOURCE ACCOMMODATION ASSISTANCE APPARATUS

TECHNICAL FIELD

The present invention relates to a resource accommodation assistance system, a resource accommodation assistance method, and a resource accommodation assistance apparatus.

BACKGROUND ART

It can be said that the prosperity of a power generation form using renewable energy has been continued with the help of the Feed-in Tariff (FIT) Scheme. However, the Feed-in Tariff Scheme is scheduled to end from 2019. In the future, therefore, it becomes necessary to conduct studies of the use of facilities, transactions in electricity, and others related to the power generation form.

For example, there have been proposed various conventional techniques concerning transactions in electricity. There has been proposed, for example, a power sale point adding system including: a power purchaser terminal that is connected to a power generation device utilizing natural energy and is configured to receive data on an amount of power generated by the power generation device, via a network; and a power seller terminal that is connected to a valuable point adding server having an arithmetic function of converting generated power into a valuable point or credit, wherein the valuable point or credit is transmitted to the power seller terminal via the network (see PTL 1).

There has also been proposed, for example, a power purchase and sale system including: a power seller-side system installed in a power seller's house; and a power purchaser-side system installed in a predetermined facility, wherein the power seller-side system includes: a first communication unit for communicating with the power purchaser-side system via a predetermined network; a sellable power amount calculation unit installed in the house, for measuring an amount of power generated by a power generation system utilizing renewable energy for generating power and a total amount of power consumed by load equipment in the house, and for calculating an amount of sellable power, based on the amount of generated power and the total amount of consumed power thus measured; and a power sale negotiation unit for preparing a power sale condition based on the amount of sellable power calculated by the sellable power amount calculation unit, for sending the prepared power sale condition to the power purchaser-side system via the first communication unit, for analyzing a power purchase condition when receiving the power purchase condition from the power purchaser-side system, for selecting any response policy from acceptance of the power purchase condition, rejection of the power purchase condition, and change of the power sale condition, based on a result of the analysis, and for issuing a notification based on the selected response policy to the power purchaser-side system, and wherein the power purchaser-side system includes: a second communication unit for communicating with the power seller-side system via the predetermined network; a demand situation acquisition unit for acquiring a power demand situation in the facility; and a power purchase negotiation unit for analyzing a power sale condition when receiving the power sale condition from the power seller-side system, for selecting any response policy from acceptance of the power sale condition, rejection of the power sale condition, and preparation of a power purchase condition, based on a result of the analysis and the power demand situation acquired by the demand situation acquisition unit, and for issuing a notification based on the selected response policy to the power seller-side system (see PTL 2).

There has also been proposed, for example, a power resource trading system for on-line trading in power resource among power production entities each having a terminal device connected to a power resource trading management server via a network, wherein the power resource trading management server includes a purchase and sale condition registration unit and a substantially purchasable and sellable power amount calculation unit, the purchase and sale condition registration unit has a function of registering a sale condition containing an amount of power suggested to sell and a suggested price of the power, the amount and price being presented by one of the power production entities that intends to sell power, in units of time periods to which 24 hours a day are allocated, through the terminal device of the power production entity that intends to sell power, via the network, the substantially purchasable and sellable power amount calculation unit has a function of obtaining an amount of power calculated by subtracting a feeding loss in feeding power from the power production entity to another power production entity from the amount of the power suggested to sell, the amount being presented by the power production entity that intends to sell the power, as a corrected amount of the power suggested to sell, in the units of time periods, the terminal device of each power production entity has a user interface that displays a power trading screen having a suggested selling power display part and a power trading execution part in the units of time period, the suggested selling power display part displays at least the corrected amount of the power suggested to sell and the suggested price of the power presented by the power production entity that intends to sell the power, as power suggested to sell, and the power trading execution part displays a purchase order box for the power suggested to sell, the purchase order box being capable of selecting any of one or more items of the power suggested to sell, displayed on the suggested selling power display part (see PTL 3).

There has also been proposed, for example, a power trading matching system for accommodating surplus power in a plurality of customers each of which owns a power generation device and a storage battery, the power trading matching system including: a required power amount information acquisition part that acquires information about a power amount required in a predetermined time period by a first customer; a customer information acquisition part that acquires information about the power generation device and the storage battery owned by a second customer, and a power consumption amount of the second customer; a surplus power estimation part that estimates a surplus power amount that can be supplied at the second customer based on information about a generated power amount of the power generation device, a stored power amount in the storage battery, and the power consumption amount in the predetermined time period of the second customer acquired in the customer information acquisition part; and a matching part that collates the surplus power amount that can be supplied from the second customer estimated in the surplus power estimation part with the information about the required power amount of the first customer acquired by the required power amount information acquisition part and detects a combination of the first customer and the second customer between which trading is established (see PTL 4).

There has also been proposed, for example, a power distribution determination apparatus that determines a distribution of power from a plurality of power supply units to a plurality of power receiving units, including: a supply information acquisition unit that acquires supply information from each of the power supply units, the supply information indicating a supply energy, the supply energy being energy being able to be supplied or expected energy being able to be supplied from the power supply unit; a demand information acquisition unit that acquires demand information from each of the power receiving units, the demand information indicating a demand energy and accepting conditions, the demand energy being a required energy or an expected required energy, the accepting condition being condition related to a power supply unit that accepts to supply power; a first matching unit that performs first matching for determining one or a plurality of the power supply units that supply power to each of the power receiving units so as to fulfill the accepting conditions corresponding to each power receiving unit; a surplus power supply unit determination unit that determines a surplus power supply unit by a result of the first matching, the surplus power supply unit being the power supply unit in which a portion or the entirety of the supply energy is not used; and an arbitrary power receiving unit determination unit that determines an arbitrary power receiving unit receiving power from an arbitrary one of the power supply units with a result of the first matching, the arbitrary power receiving unit being the power receiving unit in which a portion or the entirety of the demand energy is not fulfilled (see PTL 5).

There has also been proposed, for example, a power management system including: two or more sites, wherein the two or more sites are connected by a distribution network including a power purchasing line on which power is purchased, a power selling line on which power is sold, and a communication line on which information is communicated, wherein each site includes a power generating apparatus generating power using natural energy, a power transmission/reception control unit transmitting power generated by the power generating apparatus to the distribution network and receiving power from the distribution network, a power selling amount measuring apparatus measuring an amount of power transmitted to the power selling line, and a power purchasing amount measuring apparatus measuring an amount of power transmitted from the power purchasing line, wherein the power transmission/reception control unit is operable, when power is sold by transmitting the power generated by the power generating apparatus to the distribution network, to transmit information necessary for selling power to the communication line of the distribution network (see PTL 6).

CITATION LIST

Patent Literature

PTL 1: JP 2011-180791 A
PTL 2: JP 2011-227837 A
PTL 3: JP 2005-284420 A
PTL 4: JP 2017-153274 A
PTL 5: JP 2015-211594 A
PTL 6: JP 2015-100264 A

SUMMARY OF INVENTION

Technical Problem

An ordinary household as an example that operates a photovoltaic power generation device or the like is incapable of accessing the existing power trading market. It is therefore difficult to secure a surplus power purchaser other than a customary electric utility. Consequently, the ordinary household is incapable of efficiently selling surplus power at an appropriate price, and enjoys no economic merit of operating the photovoltaic power generation device.

A customer of adequate size, the examples of which may include various stores, factories, and office buildings, tends to have a high need of daytime power according to its business hours. The need may possibly increase beyond the customer's initial forecast. Therefore, the customer is forced to purchase expensive power beyond a range specified in an electricity usage contract with an electric utility.

On the other hand, no technology has been proposed that efficiently establishes a link between an ordinary household's need to sell surplus power and a customer's need to purchase power. As a matter of course, there has been proposed a matching technology focusing only on the relationship between demand and supply of power. However, it is practically difficult to assume an ordinary household as a target of matching since the ordinary household is incapable of accessing the power trading market. In addition, it is difficult for both the ordinary household and the customer to find benefits other than power purchase and sale.

It is hence an object of the present invention to provide a technique that enables efficient resource accommodation between an ordinary household and a customer with a predetermined accompanying effect.

Solution to Problem

To solve the problem described above, a resource accommodation assistance system according to the present invention includes a plurality of information processing apparatuses each including: a storage unit configured to hold a distributed ledger storing transactions issued by a predetermined apparatus in accordance with events including resource sale in which a business operator in a community sells a resource to an intermediary, resource purchase in which another business operator purchases the resource which the intermediary secures through the resource sale, and another resource purchase in which the business operator purchases another resource from the other business operator with a predetermined payment token gained from the intermediary through the resource sale; and an arithmetic unit configured, in the event of resource purchase, to carry out a transaction for payment on the resource purchase and to store, in the distributed ledger, the transaction subjected to a predetermined process executed together with another information processing apparatus among the information processing apparatuses.

Alternatively, a resource accommodation assistance system according to the present invention includes a plurality of information processing apparatuses each including: a storage unit configured to hold a distributed ledger storing transactions issued by a predetermined apparatus in accordance with events including power sale in which an ordinary household sells power to a retail electric utility, power purchase in which a customer purchases the power which the retail electric utility secures through the power sale, and commodity purchase in which the ordinary household purchases a commodity from the customer with a predetermined payment token gained from the retail electric utility through the power sale; and an arithmetic unit configured, in the event of commodity purchase, to execute a predetermined smart contract previously held therein, to carry out a transaction for payment on the commodity purchase using the payment token to which a predetermined premium bearing by the customer is added, and to store, in the distributed ledger, the transaction subjected to a predetermined process executed together with another information processing apparatus among the information processing apparatuses.

A resource accommodation assistance method according to the present invention includes, by each of a plurality of information processing apparatuses each including a storage unit configured to hold a distributed ledger storing transactions issued by a predetermined apparatus in accordance with events including power sale in which an ordinary household sells power to a retail electric utility, power purchase in which a customer purchases the power which the retail electric utility secures through the power sale, and commodity purchase in which the ordinary household purchases a commodity from the customer with a predetermined payment token gained from the retail electric utility through the power sale, in the event of commodity purchase, executing a predetermined smart contract previously held therein, carrying out a transaction for payment on the commodity purchase using the payment token to which a predetermined premium bearing by the customer is added, and storing, in the distributed ledger, the transaction subjected to a predetermined process executed together with another information processing apparatus among the information processing apparatuses.

A resource accommodation assistance apparatus according to the present invention includes: a storage unit configured to hold a distributed ledger storing transactions issued by a predetermined apparatus in accordance with events including power sale in which an ordinary household sells power to a retail electric utility, power purchase in which a customer purchases the power which the retail electric utility secures through the power sale, and commodity purchase in which the ordinary household purchases a commodity from the customer with a predetermined payment token gained from the retail electric utility through the power sale; and an arithmetic unit configured, in the event of commodity purchase, to execute a predetermined smart contract previously held therein, to carry out a transaction for payment on the commodity purchase using the payment token to which a predetermined premium bearing by the customer is added, and to store, in the distributed ledger, the transaction subjected to a predetermined process executed together with another information processing apparatus among the information processing apparatuses.

Alternatively, a resource accommodation assistance system according to the present invention includes: a resource seller terminal of a resource seller; a retail resource supplier terminal of a retail resource supplier that purchases a resource from the resource seller; and a customer terminal of a customer that purchases a resource from the retail resource supplier. In the resource accommodation assistance system, the resource seller terminal, the retail resource supplier terminal, and the customer terminal communicate with one another, the retail resource supplier terminal or the customer terminal issues a payment token for use in purchase of a commodity from the customer, in accordance with an amount of the resource purchased from the resource seller, and transmits the payment token to the resource seller terminal, the resource seller terminal receives the payment token issued by the retail resource supplier terminal, and the customer terminal approves the purchase of the commodity by the resource seller using the payment token to which a predetermined premium bearing by the customer is added, and accepts the payment on the resource purchase, based on a predetermined condition.

Advantageous Effects of Invention

The present invention enables efficient resource accommodation between an ordinary household and a customer with a predetermined accompanying effect.

BRIEF DESCRIPTION OF DRAWINGS

FIG. 5 is a diagram illustrating an exemplary configuration of surplus power sale information in the present embodiment.

FIG. 6 is a diagram illustrating an exemplary configuration of issued power token information in the present embodiment.

FIG. 7 is a diagram illustrating an exemplary configuration of commodity exchange rate information in the present embodiment.

FIG. 8 is a diagram illustrating an exemplary configuration of campaign-destined commodity exchange rate information in the present embodiment.

DESCRIPTION OF EMBODIMENTS

Outline of Distributed Ledger System

First, a description will be given of a distributed ledger system that becomes a basis for a resource accommodation assistance technology according to the present embodiment. A distributed ledger technology using a blockchain (hereinafter, also abbreviated as BC) has heretofore appeared as a technology of substituting direct trading between users by P2P (Peer to Peer) for trading conducted via a reliable centralized institution such as a financial institution or a government.

The current distributed ledger technology has the following main features: (1) trading between participants in the distributed ledger system are finalized through consensus building or approval by (any or specific) participants rather than a centralized institution; (2) multiple transactions are collected into a block, a chain of the blocks is recorded in a distributed ledger called a blockchain, and the successive blocks are subjected to hash calculation that makes tampering substantially impossible; and (3) the same ledger data is shared among all the participants such that all the participants can confirm the trading.

Because of the foregoing features, applications of the distributed ledger technology using the BC in a variety of fields including the finance industry and the manufacturing industry have been studied as a mechanism for reliable data management/sharing and for contract-based trading conduct/management.

As one of such application examples, there has also been proposed a technology capable of managing a logic describing trading conditions together with trading data in a distributed ledger, that is, a smart contract in order to apply the distributed ledger technology to complex trading conditions and various kinds of application software.

As the smart contract-related technology, there have been proposed some technologies related to a distributed ledger platform having a function of executing a smart contract ("Ethereum White Paper", [online], [searched on Jun. 30, 2017], on the Internet <URL: https://github.com/ethereum/wiki/wiki/White-Paper>, "Hyperledger Fabric", [online], [searched on Jun. 30, 2017], on the Internet <URL: http://hyperledger-fabric.readthedocs.io/en/latest/>).

According to the distributed ledger platform, nodes accept transactions through consensus building at a predetermined consensus level, carry out the transactions, and hold the execution results of the transactions, so that the information (ledger) is shared among the nodes. The distributed ledger platform also has a function of executing a smart contract for executing a preset logic on the transactions.

Network Configuration

Figure 1:
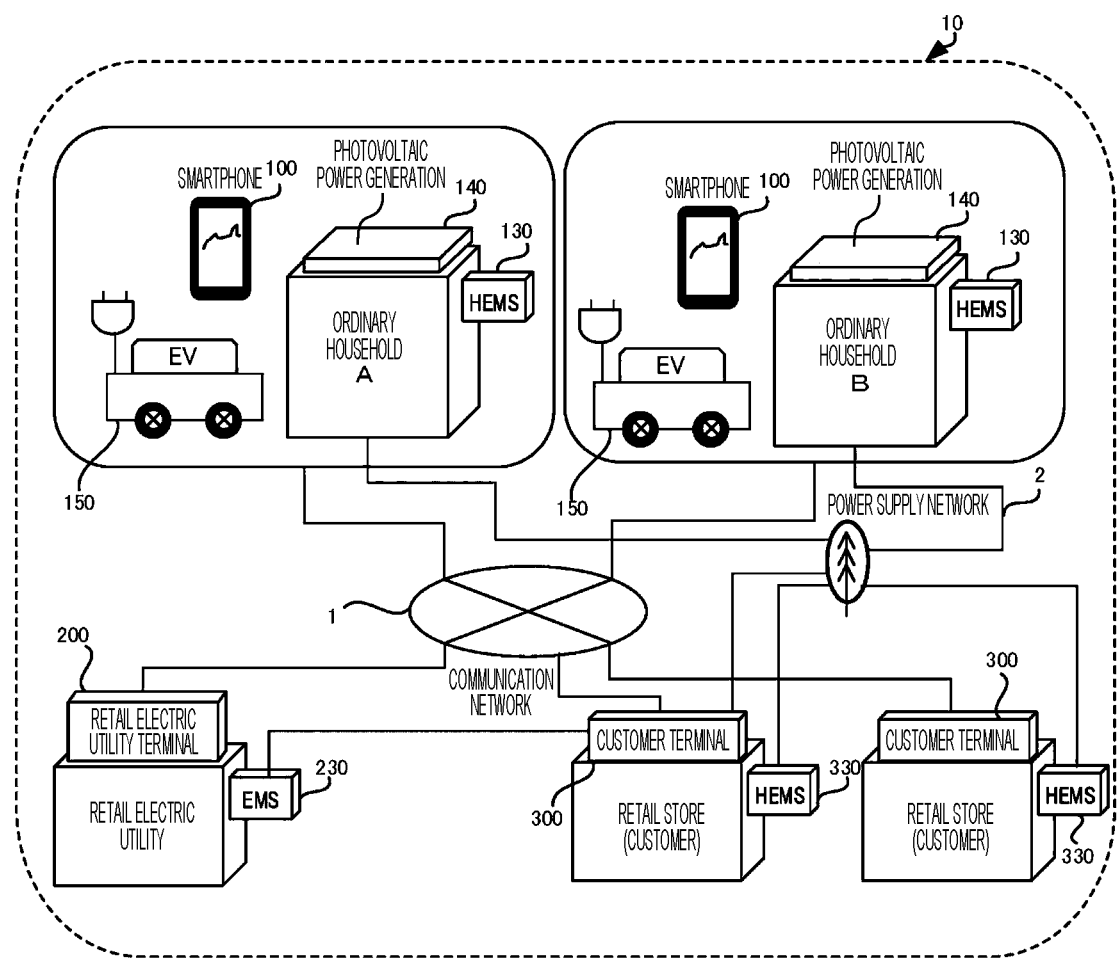
FIG. 1 is a diagram illustrating an exemplary configuration of a resource accommodation assistance system according to the present embodiment.

With reference to the drawings, a specific description will be given of an embodiment of the present invention below. FIG. 1 is a diagram illustrating an exemplary configuration of a resource accommodation assistance system 10 according to the present embodiment. The resource accommodation assistance system 10 illustrated in FIG. 1 is a computer system that enables efficient resource accommodation between an ordinary household and a customer with a predetermined accompanying effect. It is assumed herein that the resource accommodation assistance system 100 is a distributed ledger system.

The resource accommodation assistance system 10 mainly includes a smartphone 100, a retail electric utility terminal 200, and a customer terminal 300 that are distributed ledger nodes connected to a network 1 to communicate with one another. In the present embodiment, electricity is described as an exemplary resource. In the present invention, therefore, a resource seller corresponds to an ordinary household that is a user of the smartphone 100, and a retail resource supplier corresponds to a retail electric utility that is a user of the retail electric utility terminal 200.

The resource described herein is not limited to electricity. In addition to electricity, examples of the resource may include, but not limited to, gases, various fuels, materials, and personnel.

It is assumed in the present embodiment that there are a plurality of distributed ledger nodes. It is also assumed that the respective distributed ledger nodes are operated and managed by stakeholder entities (e.g., ordinary households as individuals, business operators, organizations, vendors) as users of the resource accommodation assistance system 10.

It should be noted that, although not particularly illustrated in the drawings, a terminal, such as a client node, capable of accessing information in a distributed ledger 50 (the details will be described later) may additionally connected to the network 1.

The smartphone 100 is a terminal to be used in an ordinary household of an individual. The ordinary household described in the present embodiment refers to a household capable of securing a certain degree of power generated by a photovoltaic power generation device 140 installed in a house, separately from commercial power to be fed from a retail electric utility via a power supply network 2. Therefore, a part of or all of power generated by the photovoltaic power generation device 140 can be sold as surplus power to the retail electric utility via the power supply network 2.

In the house, a home energy management system (HEMS) 130 is also installed to manage information including, for example, an amount of energy used in the house, an amount of power generated by the photovoltaic power generation device 140, and a situation of power purchase from the retail electric utility. In addition, the HEMS 130 is capable of displaying the information through a monitor and controlling an electric appliance installed in the house and connected to the HEMS 130 via a network.

The ordinary household also has an electric vehicle (EV) 150. The ordinary household is capable of selling power stored in a power storage unit of the EV 150 to the retail electric utility via the power supply network 2, in a manner similar to that for the power generated by the photovoltaic power generation device 140.

In the network 1, the retail electric utility terminal 200 is a terminal to be used in a retail electric utility. The retail electric utility is equipped with, for example, an energy management system (EMS) 230. The EMS 230 effects appropriate control for appropriately feeding or purchasing power to or from each of the stakeholders (including the ordinary household, the retail electric utility itself, and the customer) via the power supply network 2 for actual power accommodation to thereby achieve a power demand-supply balance in an area in charge.

In the network 1, the customer terminal 300 is a terminal to be used by a business operator who operates a retail store such as a convenience store. The retail store is also equipped with a HEMS 330 as in the ordinary household. The retail store receives power from the retail electric utility via the power supply network 2 to activate various electric appliances such as lighting facilities, air conditioning facilities, and cold storage facilities.

Exemplary Hardware Configurations

Figure 2:
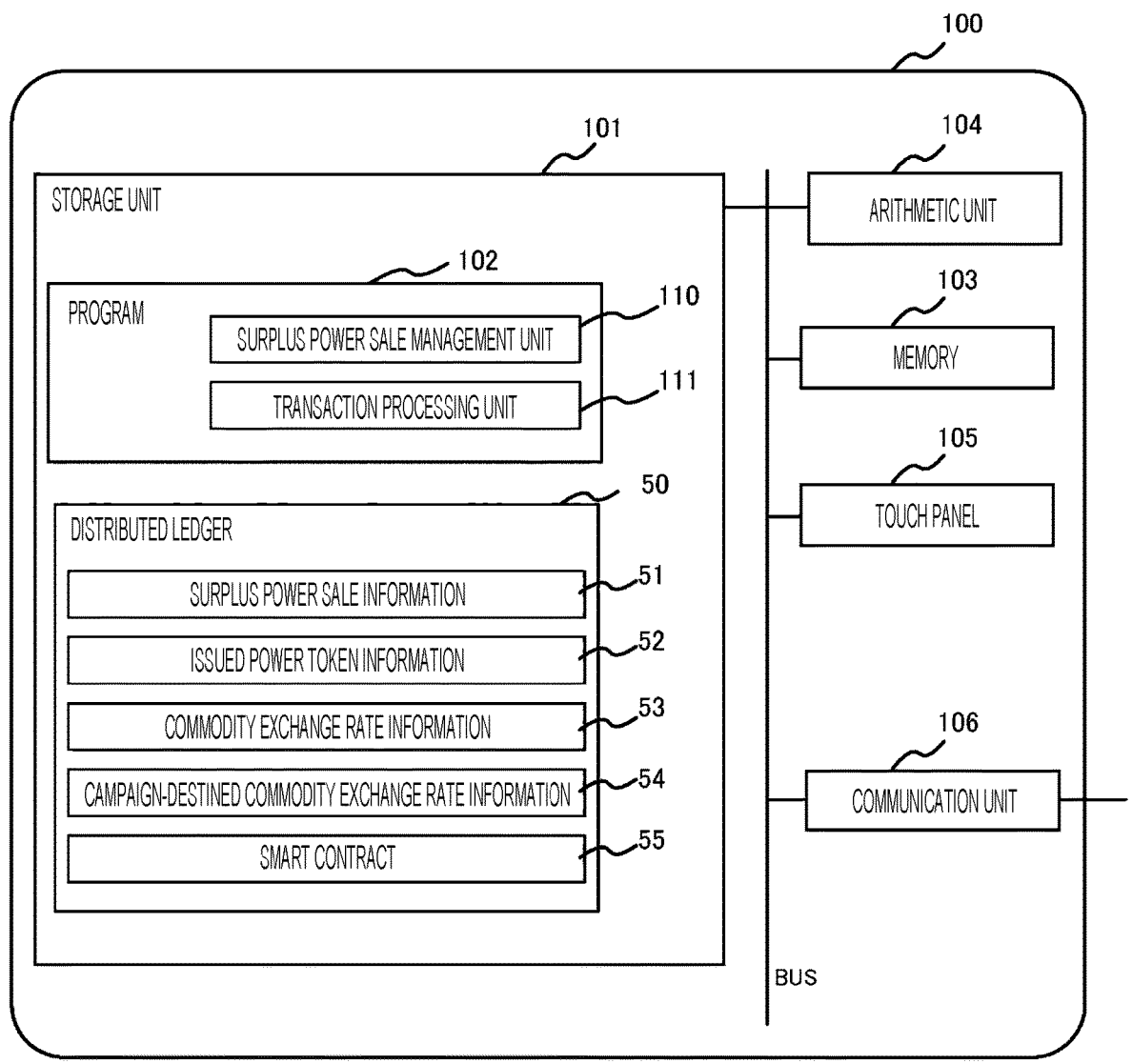
FIG. 2 is a diagram illustrating an exemplary hardware configuration of an ordinary household terminal in the present embodiment.

Next, a description will be given of an exemplary hardware configuration of each apparatus in the resource accommodation assistance system 10. FIG. 2 is a diagram illustrating an exemplary hardware configuration of the smartphone 100 as the ordinary household terminal in the present embodiment.

As illustrated in FIG. 2, the smartphone 100 includes at least a storage unit 101 that includes an appropriate nonvolatile memory element, a memory 103 that includes a volatile memory element such as a random access memory (RAM), an arithmetic unit 104, such as a central processing unit (CPU), that controls the apparatus by executing a program 102 read from the storage unit 101 and loaded into the memory 103, and executes various determination, arithmetic, and control processes, a touch panel 105 that receives input from the user and provides output to the user, and a communication unit 106 that includes a network interface and is connected to the network 1 to communicate with the other apparatuses such as the retail electric utility terminal 200 and the customer terminal 300 which are other distributed ledger nodes. The communication unit 106 is also capable of communicating with the HEMS 130 through a line routed in the house.

The storage unit 101 holds a surplus power sale management unit 110 and a transaction processing unit 111 each implemented by executing the program 102. The respective functions of the surplus power sale management unit 110 and transaction processing unit 111 will be described later.

The storage unit 101 also holds the distributed ledger 50 in addition to the program 102.

The distributed ledger 50 refers to a chain of blocks (a blockchain). Each block represents transactions stored every predetermined time period by the smartphone 100. Each transaction is stored through a process according to the requirements, such as consensus building, in the distributed ledger technology. The process is executed between the smartphone 100 which is a distributed ledger node and each of the retail electric utility terminal 200 and the customer terminal 300 which are other distributed ledger nodes.

According to the management of the distributed ledger using the blockchain, multiple transactions issued through consensus building for a predetermined period of time are collected as a block. Each block has a hash value of the preceding block. The blocks are thus managed in the form of a chain. According to this management, if the value of the preceding block is changed by even one bit, the hash values of all the subsequent blocks are changed. It is therefore difficult to falsify the distributed ledger 50.

The smartphone 100, which is a distributed ledger node, accepts a transaction issued by another distributed ledger node (e.g., the retail electric utility terminal 200, the customer terminal 300) via the network 1, using the function of the transaction processing unit 111. The smartphone 100 determines whether to accept the transaction through consensus building with the other distributed ledger node. When the consensus building is made, the smartphone 100 executes a smart contract 55 (previously held in the distributed ledger 50). The smartphone 100 deploys the smart contract 55 to execute the deployed smart contract 55. The smartphone 100 records a history of the transaction and a result of the execution in the distributed ledger 50.

The distributed ledger 50 stores and manages the smart contract 55 for various events such as power sale, power purchase, and commodity purchase, and a result of executing the smart contract 55. The distributed ledger 50 has a typical data structure. Specifically, for example, the distributed ledger 50 holds state information based on a result of executing transactions in the form of a table with a history of the transactions stored as a blockchain.

The smart contract 55 involves comparing a value of a transaction issued in accordance with each event with commodity exchange rate information 53 or campaign-destined commodity exchange rate information 54 to determine an amount of a payment token and the details of a premium. The smart contract 55 is similar in other data structures to an existing typical smart contract.

Examples of the state information may include, but not limited to, surplus power sale information 51, issued power token information 52, commodity exchange rate information 53, and campaign-destined commodity exchange rate information 54.

According to the management of the distributed ledger using the blockchain, typically, tracing the blockchain leads to acquisition of a (latest) state (e.g., an account balance in cases of virtual currency, an ownership right or a value of a power token in the present embodiment). Since this processing is low in efficiency, heretofore, there is a method of caching, separately from a blockchain, latest state information obtained from each block of the blockchain.

In addition, the smartphone 100 receives a request from each node, such as the retail electric utility terminal 200, which is another distributed ledger node, the customer terminal 300, which is another distributed ledger node, or an appropriate client node, to provide a function and an interface for receiving and carrying out transactions and acquiring and viewing history information of the transactions.

The smartphone 100 causes the transaction processing unit 111 to issue a transaction. The smartphone 100 issues a transaction in accordance with an event such as power sale or commodity purchase.

The description on the blockchain such as the distributed ledger 50 is also applicable to the retail electric utility terminal 200 and the customer terminal 300, which are other distributed ledger nodes.

Figure 3:
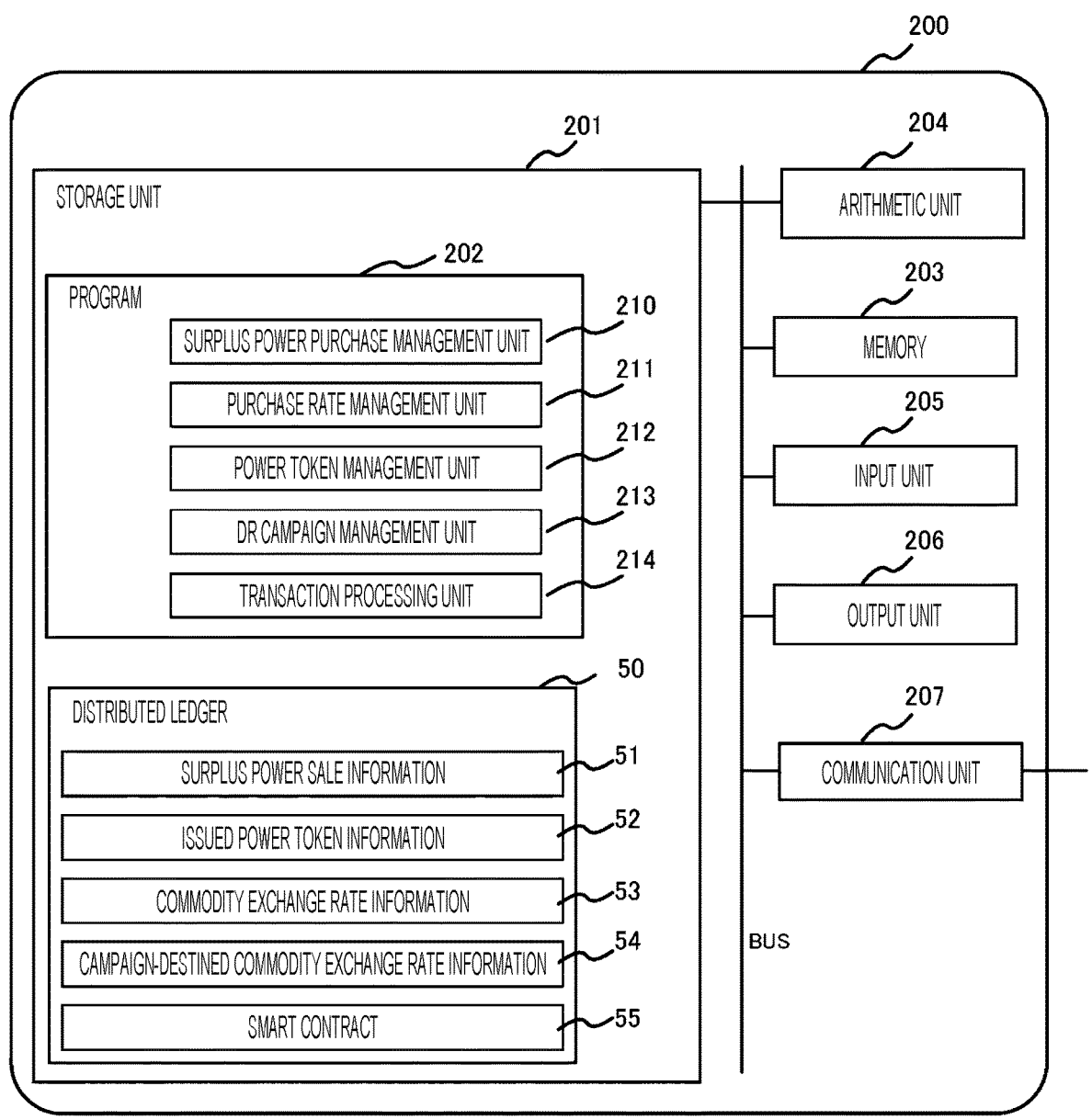
FIG. 3 is a diagram illustrating an exemplary hardware configuration of a retail electric utility terminal in the present embodiment.

As illustrated in FIG. 3, the retail electric utility terminal 200 includes at least a storage unit 201 that includes an appropriate nonvolatile memory element such as a hard disk drive, a memory 203 that includes a volatile memory element such as a RAM, an arithmetic unit 204, such as a CPU, that controls the apparatus by executing a program 202 read from the storage unit 201 and loaded into the memory 203, and executes various determination, arithmetic, and control processes, an input unit 205 that includes a keyboard and a mouse and receives input from a user, an output unit 206 that includes a display and outputs a processing result, and a communication unit 207 that includes a network interface and is connected to the network to communicate with other apparatuses such as the smartphone 100 and the customer terminal 300 which are other distributed ledger nodes. The communication unit 207 is also capable of communicating with the EMS 230 through a line routed in the premises.

The storage unit 201 holds a surplus power purchase management unit 210, a purchase rate management unit 211, a power token management unit 212, a demand response (DR) campaign management unit 213, and a transaction processing unit 214 each implemented by executing the program 202. The functions of these units 210 to 214 will be described later.

The storage unit 201 also holds the distributed ledger 50 in addition to the program 202 as in the smartphone 100.

Figure 4:
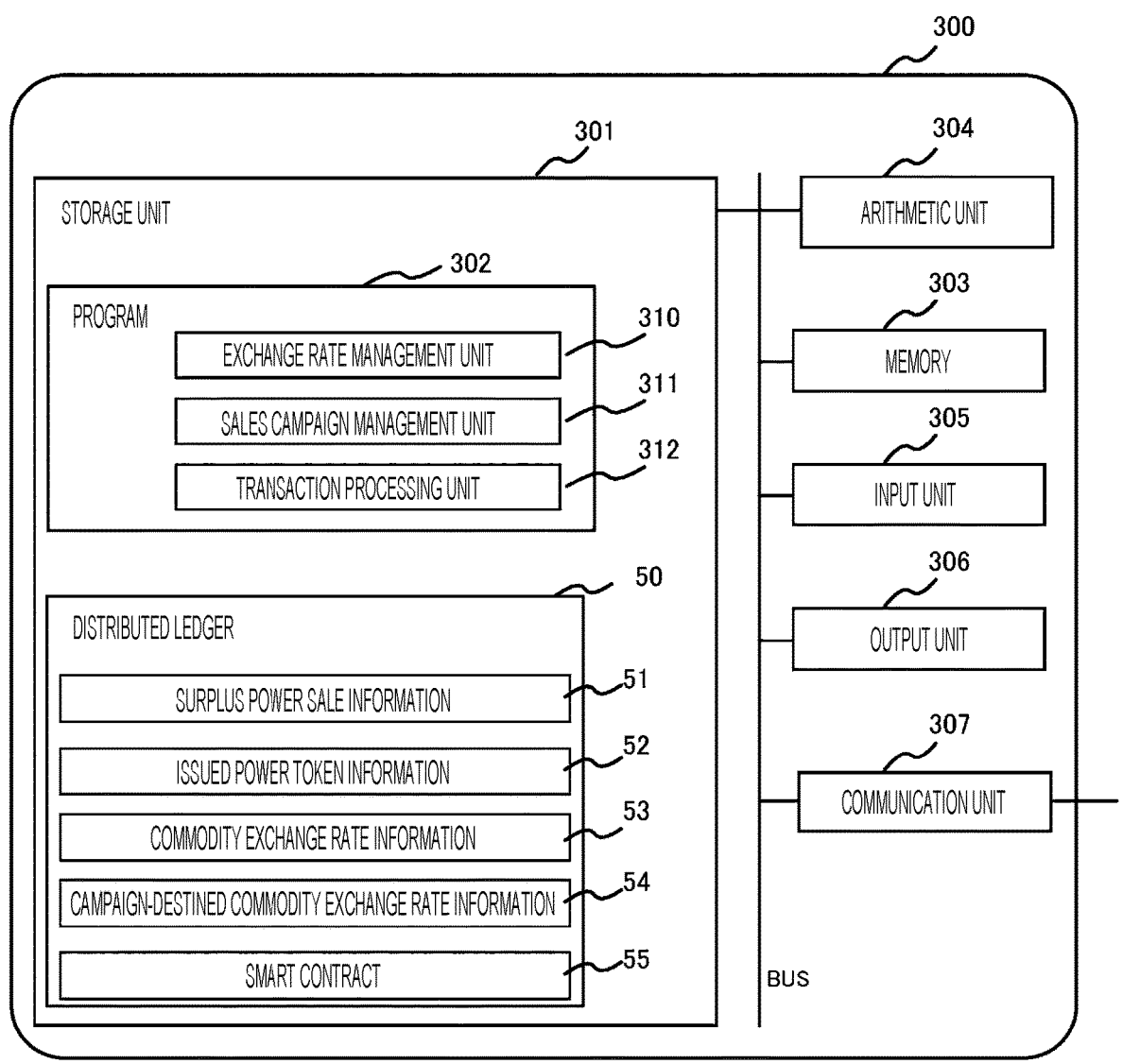
FIG. 4 is a diagram illustrating an exemplary hardware configuration of a customer terminal in the present embodiment.

As illustrated in FIG. 4, the customer terminal 300 includes at least a storage unit 301 that includes an appropriate nonvolatile memory element such as a hard disk drive, a memory 303 that includes a volatile memory element such as a RAM, an arithmetic unit 304, such as a CPU, that controls the apparatus by executing a program 302 read from the storage unit 301 and loaded into the memory 303, and executes various determination, arithmetic, and control processes, an input unit 305 that includes a keyboard and a mouse and receives input from a user, an output unit 306 that includes a display and outputs a processing result, and a communication unit 307 that includes a network interface and is connected to the network 1 to communicate with other apparatuses such as the smartphone 100 and the retail electric utility terminal 200 which are other distributed ledger nodes. The communication unit 307 is also capable of communicating with the HEMS 330 through a line routed in the store.

The storage unit 301 holds an exchange rate management unit 310, a sales campaign management unit 311, and a transaction processing unit 312 each implemented by executing the program 302. The functions of these units 310 to 312 will be described later.

The storage unit 301 also holds the distributed ledger 50 in addition to the program 302 as in the smartphone 100 and the retail electric utility terminal 200.

Examples of Information

Next, a description will be given of information held in the distributed ledger 50 held by the distributed ledger nodes in the resource accommodation assistance system 10 according to the present embodiment.

FIG. 5 illustrates an example of the surplus power sale information 51 in the present embodiment. The surplus power sale information 51 is about a transaction issued by the smartphone 100 (or the retail electric utility terminal 200) in trading for surplus power (generated in the ordinary household) between the ordinary household and the retail electric utility among the distributed ledger nodes. In other words, this transaction is issued when the ordinary household sells surplus power to the retail electric utility.

The surplus power sale information 51 has a data structure that is a set of records including data such as a source of power sale, a target of power sale, a date and time of power sale, and an amount of selling power, each concerning power sale, with a sale ID for uniquely identifying a power sale order used as a key.

FIG. 6 illustrates an example of the issued power token information 52 in the present embodiment. The issued power token information 52 is about a transaction issued by the retail electric utility terminal 200 in an event in which the retail electric utility terminal 200 of the retail electric utility gives a payment token (hereinafter, referred to as a power token) to the smartphone 100 of the ordinary household in accordance with trading for surplus power (generated in the ordinary household) between the ordinary household and the retail electric utility among the distributed ledger nodes. In other words, this transaction is issued when the retail electric utility gives the power token to the ordinary household in accordance with the sale of the surplus power.

The issued power token information 52 has a data structure that is a set of records including data such as a sale ID for power sale serving as a trigger of giving a power token, a target of token issue (i.e., the ordinary household) indicating an ownership right of the power token, a source of token issue (i.e., the retail electric utility), a date and time of token issue, and an amount of the token, with a token ID for uniquely identifying a power token used as a key.

FIG. 7 illustrates an example of the commodity exchange rate information 53 in the present embodiment. The commodity exchange rate information 53 specifies, in a case where the ordinary household makes a payment with the power token as a fund for payment in an event of commodity purchase by the ordinary household at the retail store (operated by the customer), a correspondence between a price of the commodity and an amount of the power token.

The commodity exchange rate information 53, which is information on the correspondence, contains a transaction issued by the customer terminal 300 when the customer reviews the correspondence in cycles, and registers the correspondence through the customer terminal 300.

The commodity exchange rate information 53 has a data structure that is a set of records including a value of a rate determined by the customer (i.e., a ratio between a price of the commodity and an amount of the token), with a customer ID for uniquely identifying the customer used as a key.

FIG. 8 illustrates an example of the campaign-destined commodity exchange rate information 54 in the present embodiment. The campaign-destined commodity exchange rate information 54 is rate information about a time period during which the customer operating the retail store conducts a sales campaign at the retail store and a time period during which the retail electric utility conducts a power purchase campaign for addressing the onset of a stringent power demand-supply situation.

The campaign-destined commodity exchange rate information 54 contains information on a transaction issued by the retail electric utility terminal 200 when the retail electric utility registers, through the retail electric utility terminal 200, a power purchase campaign scheduled in a time period during which the retail electric utility turns into a stringent power demand-supply state that is detected based on a forecast of a power demand situation.

During the time period, the customer intends to tie up the sales campaign with the retail electric utility, and registers commodity exchange rate information containing the premium considered upon purchase of a commodity in the time period (defined in the commodity exchange rate information 53).

The campaign-destined commodity exchange rate information 54 has a data structure that is a set of records including values of a target time period in which the retail electric utility turns into a stringent power demand-supply state forecast by the retail electric utility, a customer ID of the customer that conducts a sales campaign in the time period, a rate α, and a rate β, each concerning a campaign, with a campaign ID for uniquely identifying the campaign used as a key.

The rate α refers to a ratio between a price of power purchased by the retail electric utility and an amount of a power token given to the ordinary household. The retail electric utility determines each of the price of the power and the amount of the power token in the time period. The rate β is determined by the customer based on the commodity exchange rate information 53 in the time period.

First Embodiment

With reference to the drawings, next, a description will be given of an actual procedure of a resource accommodation assistance method according to the present embodiment. Various operations corresponding to the resource accommodation assistance method to be described below are implemented by the programs respectively executed by the apparatuses, which constitute the resource accommodation assistance system 10 and cooperate with one another, in such a manner that each apparatus loads the program into the memory. The programs have codes for implementing the various operations to be described below.

Figure 9:
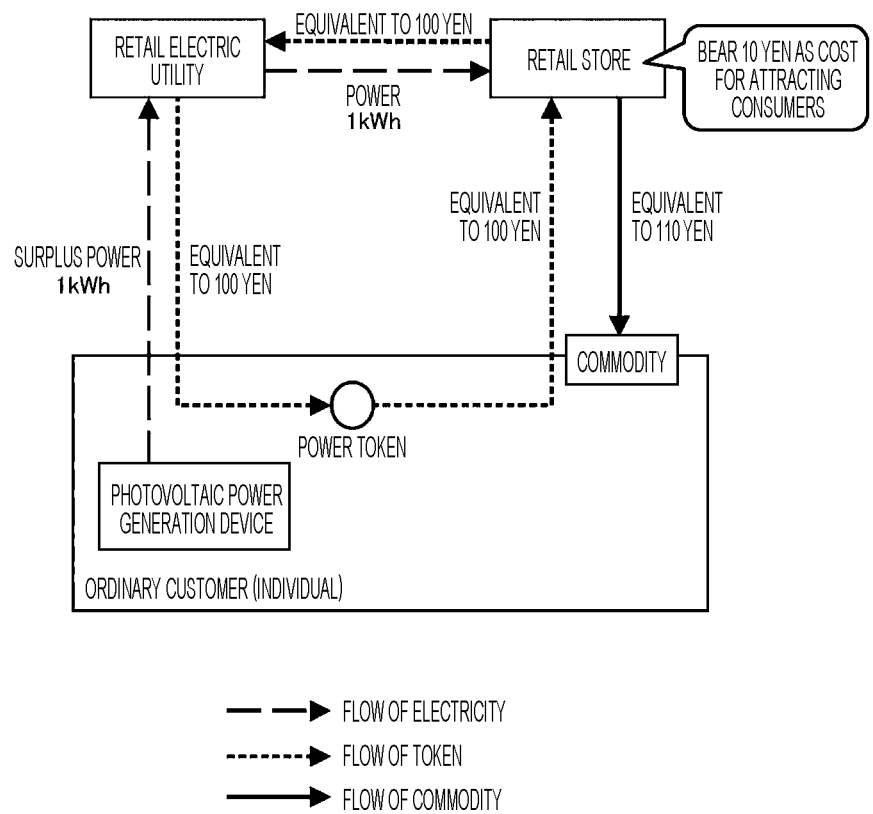
FIG. 9 is a diagram illustrating an exemplary concept of a resource accommodation assistance method according to a first embodiment.

FIG. 9 is a diagram illustrating an exemplary concept of the resource accommodation assistance method according to the present embodiment. In this case, the ordinary household, which is the individual, sells surplus power generated by the photovoltaic power generation device 140 in the house to the retail electric utility to obtain as its consideration a power token (e.g., a power token equivalent to 100 yen per unit power consumption).

The power token equivalent to 100 yen is exchangeable with a commodity equivalent to 110 yen in the retail store as stipulated in the commodity exchange rate information 53. That is, the customer that operates the retail store bears a premium equivalent to 10 yen as a cost for attracting consumers and enjoying consumers' favor.

On the other hand, the retail store is capable of purchasing power equivalent to 100 yen from the retail electric utility with the power token received from the individual in the ordinary household, as the payment for the commodity.

According to this form, the retail store is able to aim at attracting ordinary households as consumers and enjoying the consumers' favor. In addition, since the ordinary household, which is the individual, is able to sell surplus power generated in the house, the retail electric utility may attract clients and enjoy the clients' favor.

Figure 10:
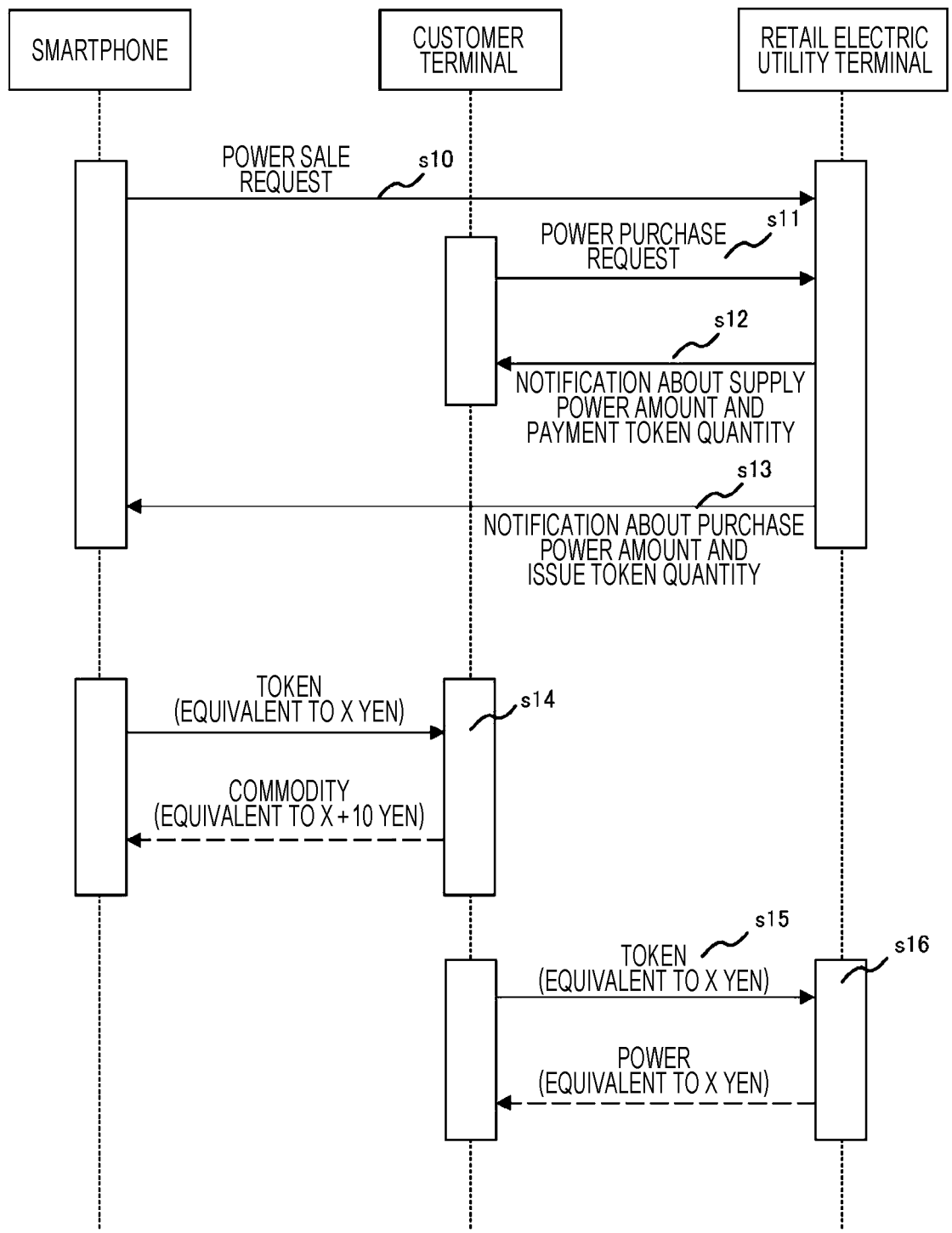
FIG. 10 is a diagram illustrating an exemplary sequence in the resource accommodation assistance method according to the first embodiment.

FIG. 10 illustrates an exemplary sequence in the resource accommodation assistance method according to the first embodiment. A description will be given of an exemplary sequence in a case of implementing the resource accommodation assistance method based on the concept described above.

Figure 13:
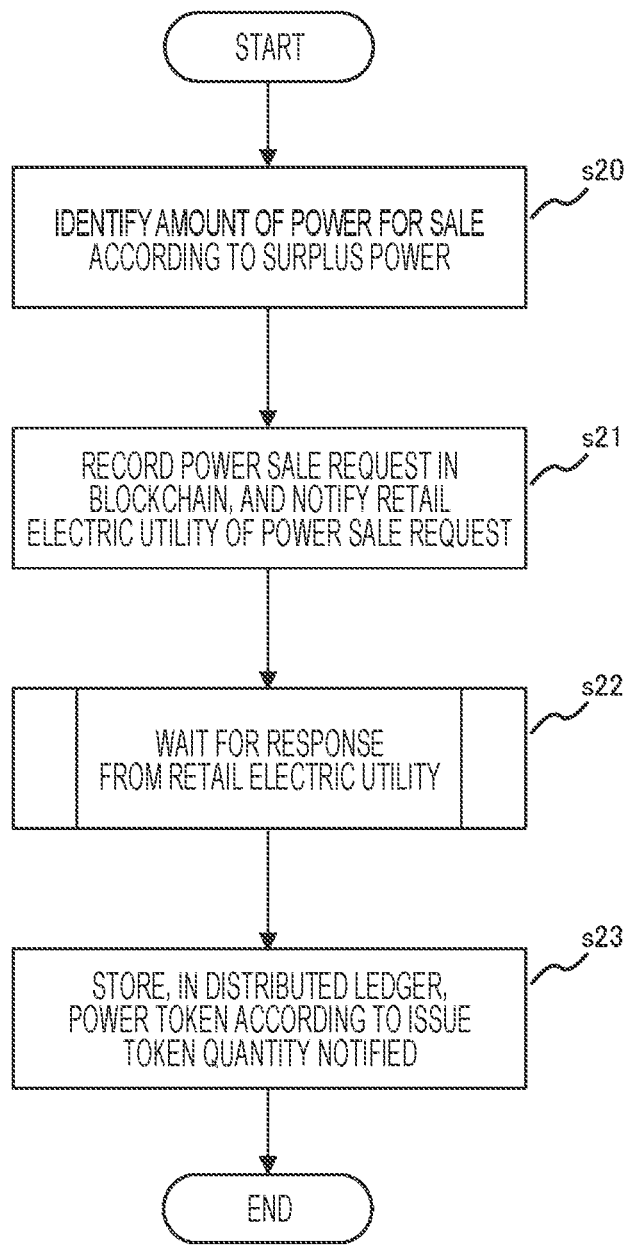
FIG. 13 is a diagram illustrating flow example 1 in the resource accommodation assistance method according to the first embodiment.

In this case, the smartphone 100 receives, for example, information on surplus power from the HEMS 130, identifies, for example, a predetermined ratio of the surplus power as a selling power amount, based on the information on the surplus power, and transmits, to the retail electric utility terminal 200, a power sale request containing the information on the selling power amount (s10; s20 to s22 in a flow of FIG. 13).

In transmitting the power sale request, the transaction processing unit 111 issues a transaction (s21 in the flow of FIG. 13), and delivers the transaction to the retail electric utility terminal 200 and the customer terminal 300, which are other distributed ledger nodes, via the network 1 (similar things apply to the following).

The delivered transaction is subjected to appropriate processes, such as consensus building, in each distributed ledger node as described above, and then is stored in the block of each distributed ledger 50 to form a blockchain.

The power sale request contains, for example, identification information of a source of power sale, that is, an ordinary household, identification information of a retail electric utility as a target of power sale, a date and time of power sale, and an amount of selling power. That is, the contents of the power sale request correspond to the values in the records of the surplus power sale information 51. As a matter of course, these values are contained in the transaction issued by the transaction processing unit 111 in the event.

The customer terminal 300 receives, for example, a predetermined instruction from the customer as the user, and transmits a power purchase request according to the instruction to the retail electric utility terminal 200 (s11). In this case, when it is expected based on information such as a demand forecast from the HEMS 330 that the retail store becomes short of power over the regulations of the original power use contract, the customer intends to use purchased power for compensating for the shortage of power in the retail store.

In transmitting the power purchase request, the transaction processing unit 312 of the customer terminal 300 issues a transaction, and delivers the transaction to the retail electric utility terminal 200 and the smartphone 100, which are other distributed ledger nodes, via the network 1 (similar things apply to the following).

The delivered transaction is subjected to appropriate processes, such as consensus building, in each distributed ledger node as described above, and then is stored in the block of each distributed ledger 50 to form a blockchain.

The power purchase request contains, for example, identification information of a power purchase source, that is, a customer, identification information of a retail electric utility as a power purchase target, a power purchase date and time, and a purchase power amount. As a matter of course, these values are contained in the transaction issued by the transaction processing unit 312 in the event.

Figure 14:
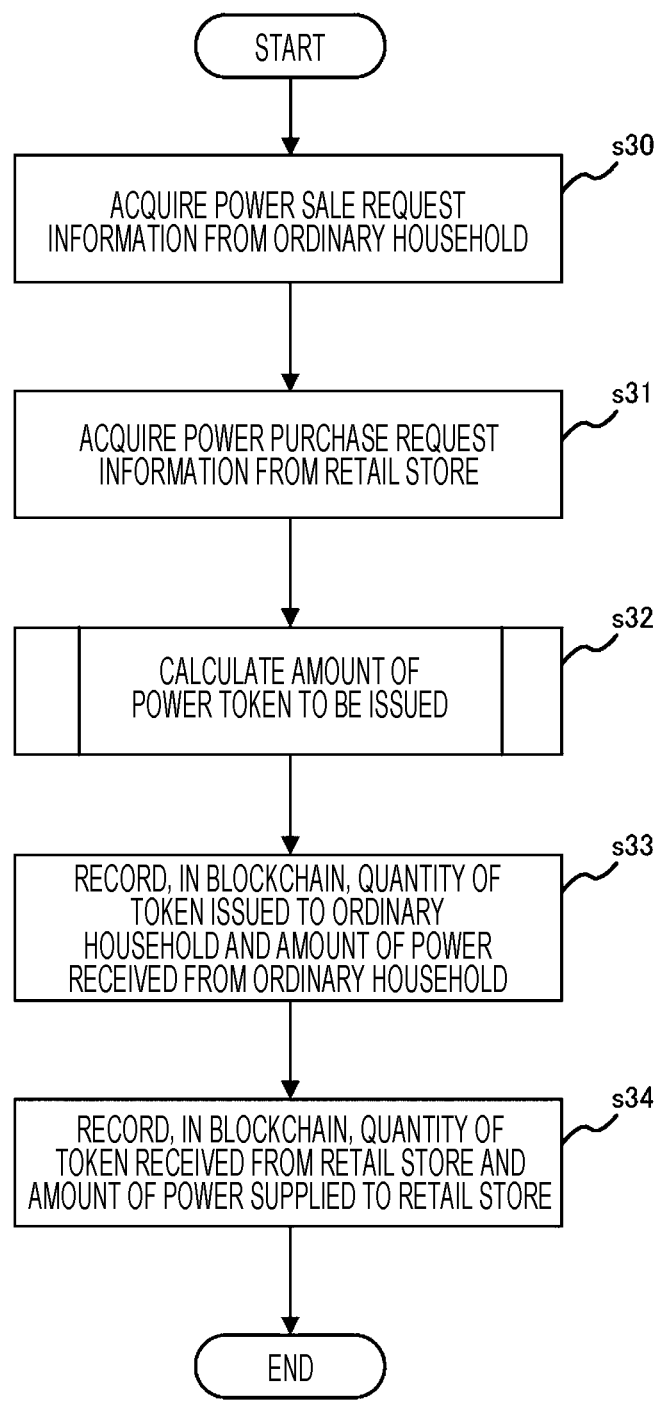
FIG. 14 is a diagram illustrating flow example 2 in the resource accommodation assistance method according to the first embodiment.

On the other hand, the retail electric utility terminal 200 receives the power sale request and the power purchase request (s30, s31 in a flow of FIG. 14). The retail electric utility terminal 200 identifies, as a response to the power purchase request, a supply power amount that is an amount of power to be supplied, as to the amount of power which the customer intends to purchase based on the power purchase request and a payment token quantity that is an amount of a power token which the retail electric utility receives from the customer as payment for the power thus supplied (s32 in the flow of FIG. 13). The retail electric utility terminal 200 then notifies the customer terminal 300 of the identified information (s12). The identification of the supply power amount and payment token quantity will be described later.

As a matter of course, in the event of notification about the supply power amount and the payment token quantity, the transaction processing unit 214 of the retail electric utility terminal 200 issues a transaction, and then stores in the distributed ledger 50 the transaction subjected to delivery to the other distributed ledger nodes, consensus building, and the like (s34 in the flow of FIG. 14).

The retail electric utility terminal 200 identifies, as a response to the power sale request from the ordinary household, a purchase power amount that is an amount of power to be purchased, as to the amount of power which the ordinary household intends to sell based on the power sale request and an issue token quantity that is an amount of a power token to be issued in accordance with the purchase power amount. The retail electric utility terminal 200 then notifies the smartphone 100 of the identified information (s13). The identification of the purchase power amount and issue token quantity will be described later.

Figure 11:
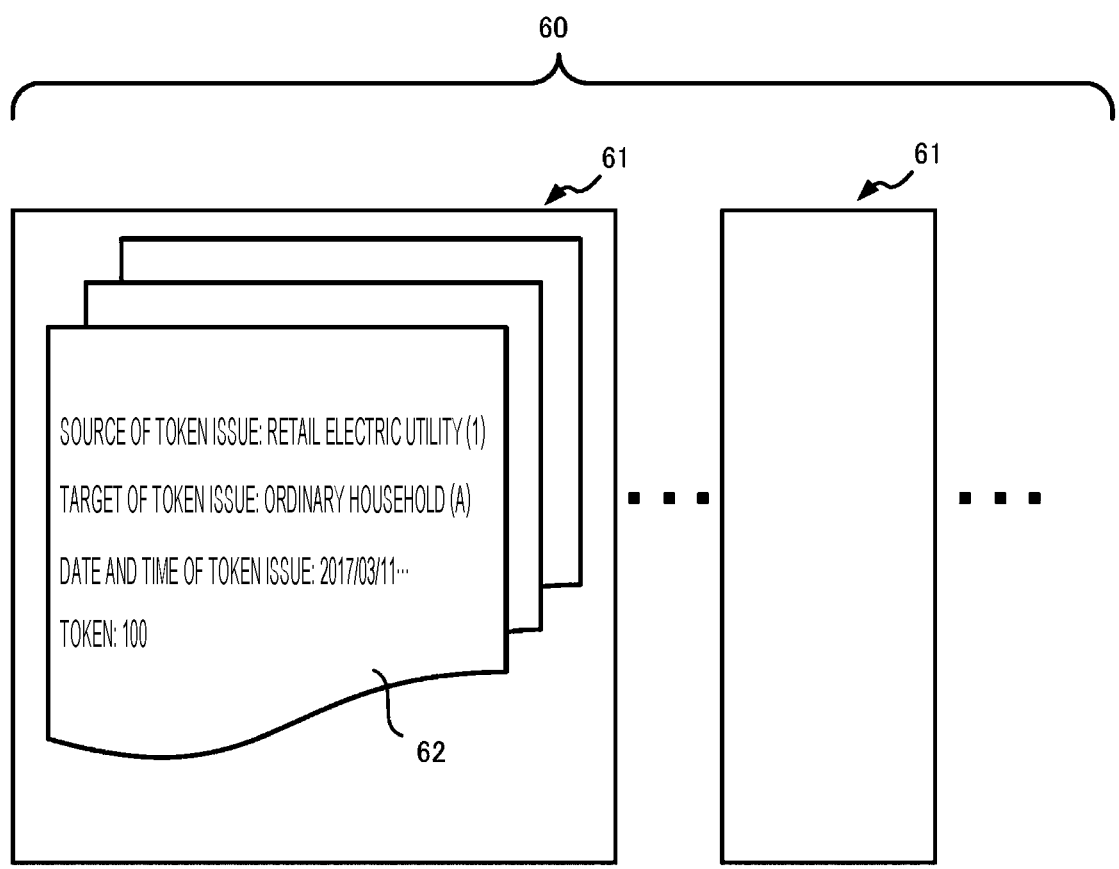
FIG. 11 is a diagram illustrating blockchain example 1 in the first embodiment.

As a matter of course, in the event of notification about the purchase power amount and the issue token quantity, the transaction processing unit 214 of the retail electric utility terminal 200 issues a transaction (e.g., a transaction 62 contained in a block 61 of a blockchain 60 illustrated in FIG. 11), and then stores in the distributed ledger 50 the transaction subjected to delivery to the other distributed ledger nodes, consensus building, and the like (s33 in the flow of FIG. 14).

Figure 15:
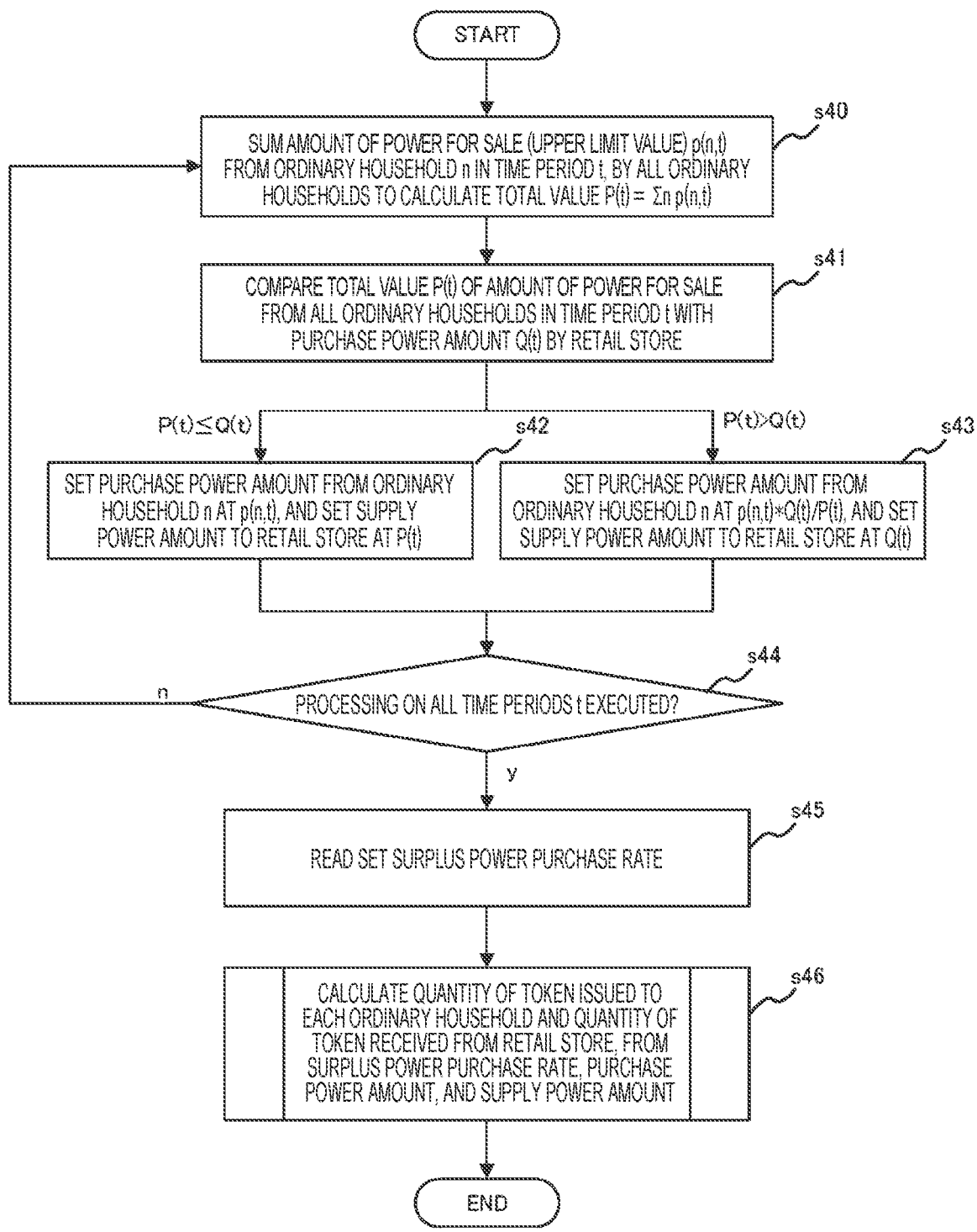
FIG. 15 is a diagram illustrating flow example 3 in the resource accommodation assistance method according to the first embodiment.

With reference to FIG. 15, next, a description will be given of a specific flow of the processing of identifying the supply power amount and the payment token quantity as the response to the power purchase request (s32 in the flow of FIG. 14) and a specific flow of the processing of identifying the purchase power amount and the issue token quantity as the response to the power sale request.

In this case, the retail electric utility terminal 200 sums a selling power amount (an upper limit value) p(n,t) that is an amount of power sold by an ordinary household n based on a power sale request in a certain time period t of a day, by all ordinary households in an area where the retail electric utility is in charge, to calculate a total value P(t)=Σn p(n,t) (s40).

Next, the retail electric utility terminal 200 compares the total value P(t) of the selling power amounts from all the ordinary households in the time period t with a purchase power amount Q(t) that is an amount of power purchased by a certain retail store based on a power purchase request in the time period t (s41).

As a result of the comparison, when a relation of P(t)≤Q(t) is satisfied, the retail electric utility terminal 200 sets the purchase power amount from the ordinary household n at p(n,t), and also sets the supply power amount to the retail store at P (t) (s42).

On the other hand, as a result of the comparison, when a relation of P(t)>Q(t) is satisfied, the retail electric utility terminal 200 sets the purchase power amount from the ordinary household n at p(n,t)*Q(t)/P(t), and also sets the supply power amount to the retail store at Q(t) (s43).

Next, the retail electric utility terminal 200 determines whether to execute the same processing on all the time periods (s44). When there is an unprocessed time period (s44: n), the retail electric utility terminal 200 returns the processing to s40.

As a result of the determination, when there is no unprocessed time period (s44: y), the retail electric utility terminal 200 reads information on a surplus power purchase rate that is held in advance in the storage unit 201 (s45). The surplus power purchase rate may be, for example, a purchase price (e.g., 100 yen) per unit power consumption (1 kwh).

The retail electric utility terminal 200 calculates a quantity of a power token to be issued to each ordinary household based on the power sale request and a quantity of a power token to be received from the retail store (the customer) based on the power purchase request, in accordance with the surplus power purchase rate as well as the purchase power amount from each ordinary household and the supply power amount to the retail store determined in s42 or s43 (s46). The retail electric utility terminal 200 then terminates the processing.

Figure 16:
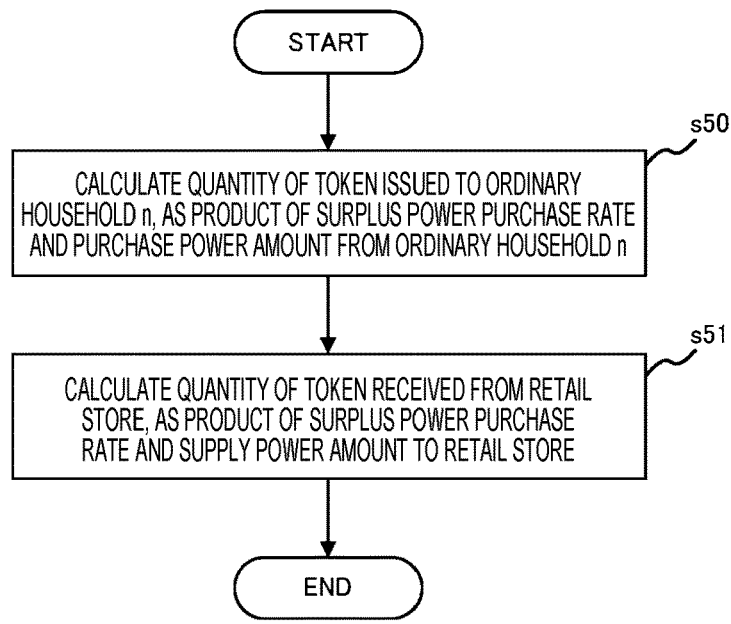
FIG. 16 is a diagram illustrating flow example 4 in the resource accommodation assistance method according to the first embodiment.
Figure 17:
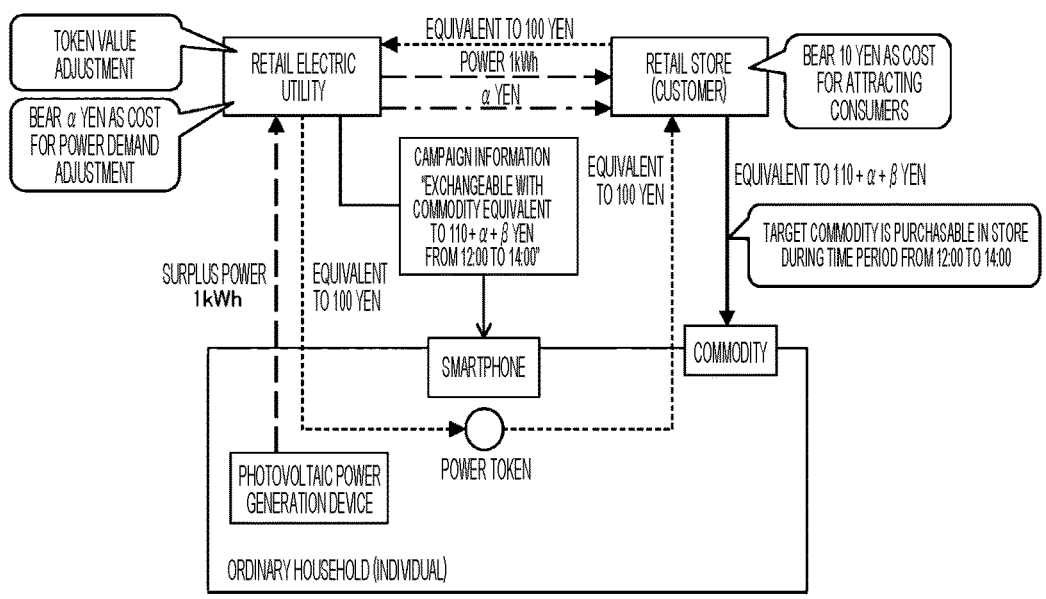
FIG. 17 is a diagram illustrating an exemplary concept of a resource accommodation assistance method according to a second embodiment.

As illustrated in s50 in a flow of FIG. 16, the quantity of the power token to be issued to each ordinary household is calculated as a product of the surplus power purchase rate and the purchase power amount from the ordinary household n.

As illustrated in s51 in the flow of FIG. 16, the quantity of the power token to be received from the customer is calculated as a product of the surplus power purchase rate and the supply power amount to the retail store.

Referring back to FIG. 10, the sequence is described again. Upon reception of the notification of the issue token quantity, the smartphone 100 issues a transaction containing information on the issue token quantity, that is, information on the amount of the power token, and stores in the distributed ledger 50 the transaction subjected to predetermined processes such as consensus building (s23 in the flow of FIG. 13). The smartphone 100 then turns into a standby state in which the smartphone 100 waits for an instruction from the individual in the ordinary household as the user.

It is assumed herein that the user of the smartphone 100 visits for shopping the retail store operated by the customer, while carrying the smartphone 100. In paying for a commodity, the user of the smartphone 100 is able to use a power token held in the smartphone 100 as a fund for payment.

In order to pay for a commodity, the user displays on the smartphone 100, for example, a two-dimensional code image of a power token (e.g., a power token that is displayed in the form of a two-dimensional code using predetermined power token management application software previously installed in the smartphone), and shows a clerk of the retail store the image as a fund for payment at a cash register in the retail store.

The clerk scans the image with, for example, a code reader of the cash register. It is assumed herein that the cash register is a part of the customer terminal 300 or is the customer terminal 300. Therefore, the cash register as the customer terminal 300 obtains information thus read.

The information thus read contains values of a token ID, a target of token issue, a source of token issue, a date and time of token issue, and an amount of a token, each concerning the power token.

The customer terminal 300 compares the amount of the power token indicated by the information thus read with the price of the commodity which the user intends to purchase, and executes predetermined payment processing using the power token as the fund for payment (s14).

Upon normal completion of the payment processing, the ownership right of the power token used as the fund for payment is transferred from the smartphone 100 (i.e., the individual in the ordinary household as the user of the smartphone 100) to the customer terminal 300 (i.e., the customer as the user of the customer terminal 300).

Figure 12:
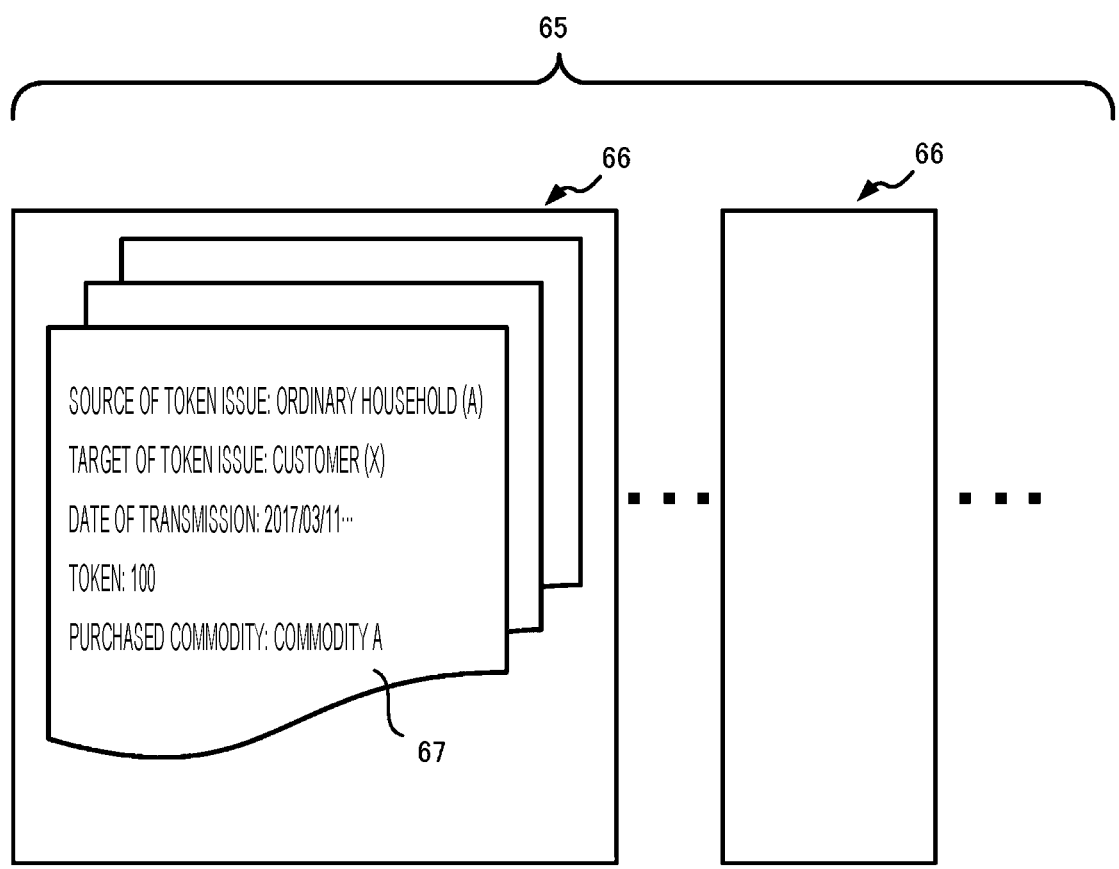
FIG. 12 is a diagram illustrating blockchain example 2 in the first embodiment.

The transaction processing unit 312 issues a transaction (e.g., a transaction 65 illustrated in FIG. 12) concerning the payment and the ownership right transfer as to the power token based on the payment, and then stores in the distributed ledger 50 the transaction subjected to delivery to the other distributed ledger nodes, consensus building, and the like. In the distributed ledger 50, for example, the record "target of token issue" in the issued power token information 52 is updated from the identification information of the ordinary household to the identification information of the customer (the ownership right is transferred from the ordinary household to the customer).

Upon normal completion of the payment, the individual in the ordinary household receives the purchased commodity from the clerk of the retail store.

Thereafter, the customer that operates the retail store is able to use, as a fund for payment, the power token the ownership right of which is obtained in s14, in purchasing power for use in the retail store (the power purchase based on the power purchase request in s11).

For example, the customer terminal 300 receives a predetermined instruction from the user, and instructs the retail electric utility terminal 200 to execute predetermined power purchase processing using its own power token as a fund for payment (s15). This instruction indicates that the supply power amount in the notification received in s12 is a purchase power amount, and the payment token quantity is a price of purchased power. Therefore, the amount of the power token to be used as the fund for payment is based on the payment token quantity.

The transaction processing unit 312 issues a transaction concerning the instruction, and then stores in the distributed ledger 50 the transaction subjected to delivery to the other distributed ledger nodes, consensus building, and the like.

The retail electric utility terminal 200 receives the instruction in s15, and executes payment processing based on purchase of power by the purchase power amount, using the power token according to the payment token quantity (s16).

The transaction processing unit 312 issues a transaction concerning the payment processing and the ownership right transfer as to the power token based on the payment processing, and then stores in the distributed ledger 50 the transaction subjected to delivery to the other distributed ledger nodes, consensus building, and the like. In the distributed ledger 50, for example, the record "target of token issue" in the issued power token information 52 is updated from the identification information of the customer to the identification information of the retail electric utility (the ownership right is transferred from the customer to the retail electric utility).

Upon normal completion of the payment processing, the purchased power is fed from the retail electric utility to the retail store of the customer via the power supply network 2.

Second Embodiment, Third Embodiment

Next, a description will be given of other embodiments on the basis of the first embodiment described above. FIG. is a diagram illustrating an exemplary concept of a resource accommodation assistance method according to a second embodiment.

The second embodiment is different from the first embodiment in that the retail electric utility monitors a power demand-supply situation and, when it is expected that power demand-supply becomes stringent in a certain time period, increases a value of a power token in the relevant time period to a predetermined degree.

For example, on the assumption that a stringent power demand-supply time period is from 12:00 to 14:00, in a case where the ordinary household sells power in this time period, the retail electric utility adds a premium α equivalent to 5 yen as a power demand-supply adjustment cost to a power token equivalent to 100 yen. In addition, the retail store (the customer) further adds to the power token a premium β equivalent to 15 yen as a sales campaign cost for attracting consumers. That is, when the ordinary household sells power equivalent to 100 yen, the ordinary household is able to receive a power token exchangeable with a commodity equivalent to 120 yen (=100 yen+α+β).

According to this concept, the individual in the ordinary household goes out at the invitation of the campaign, so that the amount of power consumption in the ordinary household naturally decreases. This leads to acquisition of negawatt power and attainment of a peak shift concerning the stringent power demand-supply time period. The retail electric utility thus achieves a reduction in cost for additionally purchasing power from the outside during peak hours. The retail store facilitates sale of a commodity which the retail store intends to sell in a target time period, for a consumer, that is, the individual. The retail store therefore efficiently achieves commodity promotion and inventory adjustment.

Figure 18:
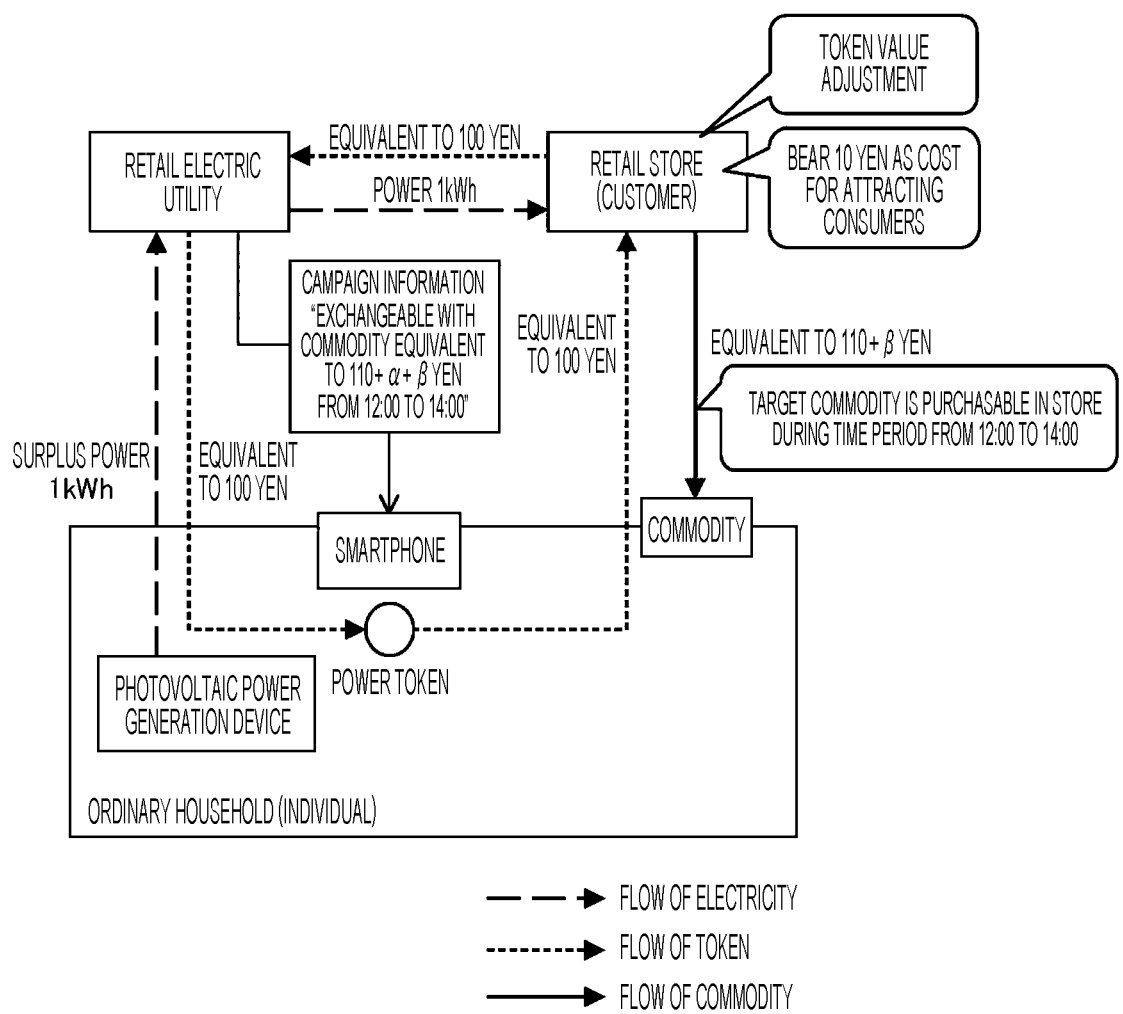
FIG. 18 is a diagram illustrating an exemplary concept of a resource accommodation assistance method according to a third embodiment.

FIG. 18 is a diagram illustrating an exemplary concept of a resource accommodation assistance method according to a third embodiment. The third embodiment involves no concept as the foregoing measures taken by the retail electric utility in the stringent power demand-supply situation. According to the third embodiment, the retail store simply increases a value of a power token in a predetermined time period as a campaign for attracting consumers.

For example, in a case where an individual in a certain ordinary household purchases a commodity at the retail store in a time period from 12:00 to 14:00, the individual is able to exchange a power token equivalent to 100 yen with a commodity whose price is a sum of 100 yen, a normal premium equivalent to 10 yen, and an extra premium equivalent to β yen added at the retail store. At this time, the retail store bears the extra premium equivalent to β yen as a cost for attracting consumers.

According to this concept, the retail store allows the individual to purchase a commodity which the retail store intends to sell at a desired timing. The retail store therefore efficiently achieves commodity promotion and inventory adjustment.

Figure 19:
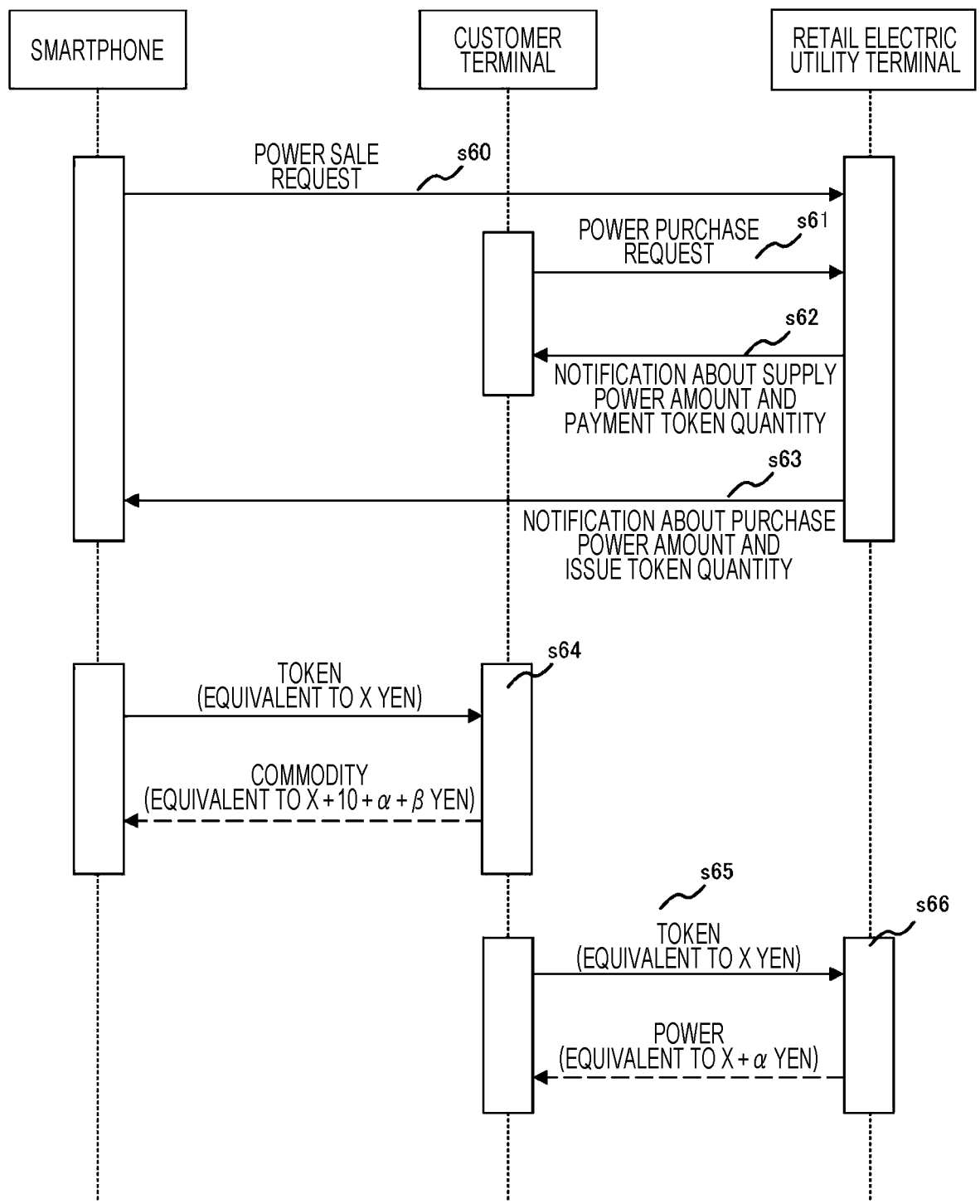
FIG. 19 is a diagram illustrating an exemplary sequence in the resource accommodation assistance method according to the second embodiment.

Next, a specific description will be given of the resource accommodation assistance method according to the second embodiment. FIG. 19 is a diagram illustrating an exemplary sequence in the resource accommodation assistance method according to the second embodiment. The third embodiment is similar to the second embodiment except the configuration of the retail electric utility addressing stringent power demand-supply; therefore, the specific description thereof will not be given.

The general flow of the sequence illustrated in FIG. 19 is similar to that of the sequence illustrated in FIG. 10. The flow of the sequence illustrated in FIG. 19 involves processing for campaign information including identification of the premiums α and β to be added to a power token.

Figure 20:
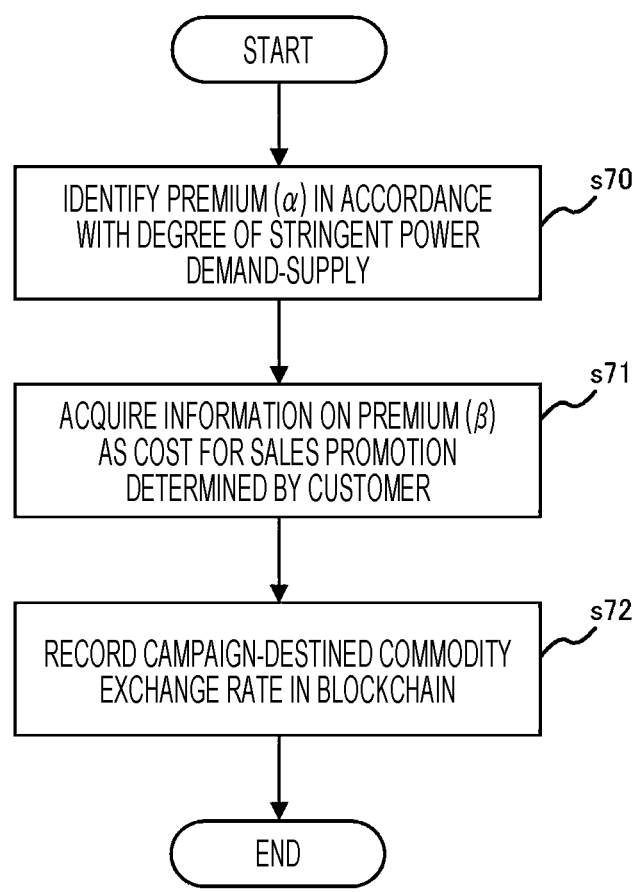
FIG. 20 is a diagram illustrating flow example 1 in the resource accommodation assistance method according to the second embodiment.

With reference to a flow of FIG. 20, first, a description will be given of the identification of the premiums α and β. FIG. 20 is a diagram illustrating flow example 1 in the resource accommodation assistance method according to the second embodiment.

In this case, the retail electric utility terminal 200 identifies, based on information received from, for example, the EMS 230 or an existing power demand-supply monitor system, the time period in which stringent power demand-supply is forecast, and also identifies the premium α based on a predefined rule in accordance with the degree of stringent power demand-supply (s70).

For example, the degree of stringent power demand-supply is defined at three levels: "very high" which means a state in which a supply amount exceeds a demand amount by 3% or less, "high" which means a state in which the supply amount exceeds the demand amount in a range from 3% or more to 6% or less, and "slightly high" which means a state in which the supply amount exceeds the demand amount in a range from 6% or more to 8% or less. In addition, a correspondence between the degree of stringent power demand-supply and the premium α is also specified at three levels: "5 yen" to be set in a case where the degree of stringent power demand-supply is very high, "3 yen" to be set in a case where the degree of stringent power demand-supply is high, and "1 yen" to be set in a case where the degree of stringent power demand-supply is slightly high.

In this case, the retail electric utility terminal 200 identifies the premium α as "5 yen" when the degree of stringent power demand-supply in a certain time period is "very high".

Next, the retail electric utility terminal 200 acquires from the customer terminal 300 the value of the premium β which the customer sets for the time period (s71).

The retail electric utility terminal 200 issues a transaction containing the values of the premiums α and β respectively identified in s70 and s71 as campaign-destined commodity exchange rate information which the retail electric utility and the customer set for the time period, and then stores in the blockchain of the distributed ledger 50 the transaction subjected to predetermined processes such as consensus building (s72). The retail electric utility terminal 200 then terminates the processing.

Figure 21:
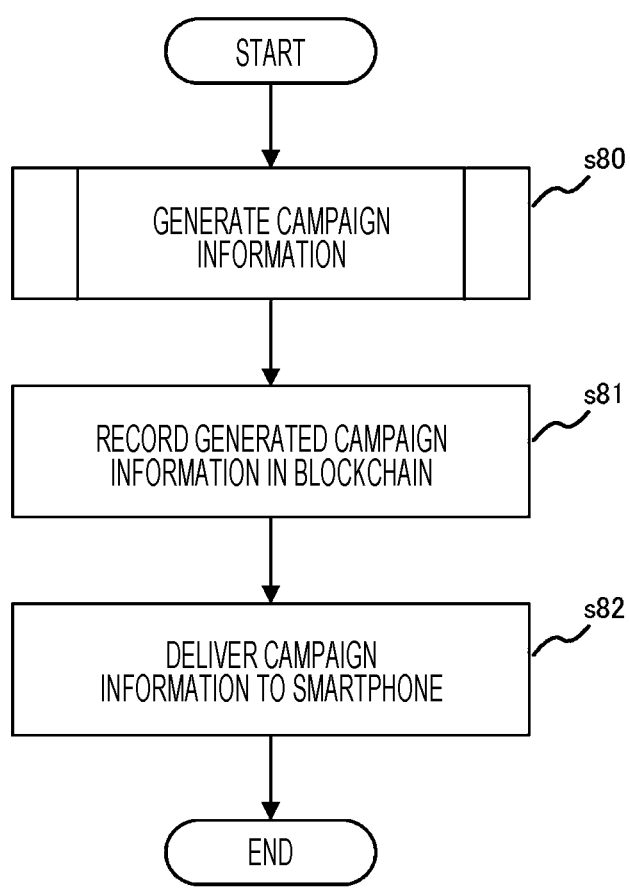
FIG. 21 is a diagram illustrating flow example 2 in the resource accommodation assistance method according to the second embodiment.

As illustrated in a flow of FIG. 21, the retail electric utility terminal 200 generates predetermined campaign information containing the campaign-destined commodity exchange rate information generated in the foregoing flow (s80), issues a transaction containing the campaign information, and then stores in the blockchain of the distributed ledger 50 the transaction subjected to predetermined processes such as consensus building (s81).

In addition, the retail electric utility terminal 200 delivers the campaign information to the smartphone 100 of the user as the individual in the ordinary household (s82). The retail electric utility terminal 200 then terminates the processing.

Figure 22:
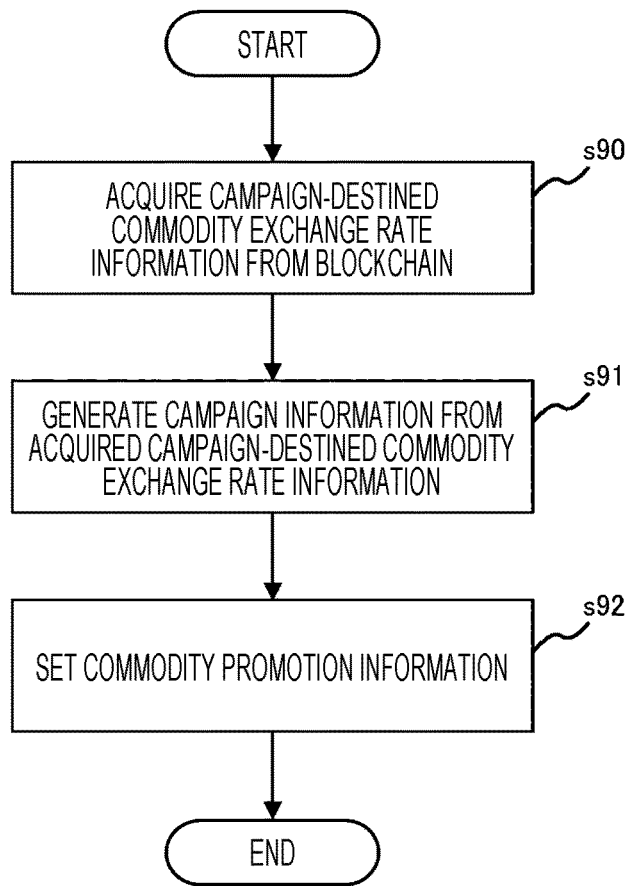
FIG. 22 is a diagram illustrating flow example 3 in the resource accommodation assistance method according to the second embodiment.
Figure 23:
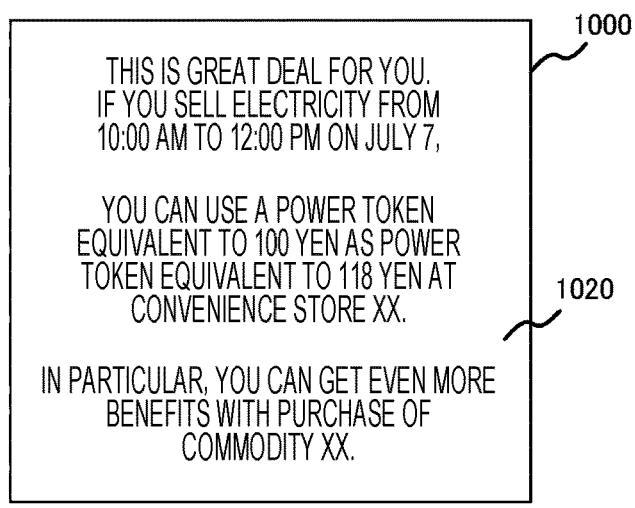
FIG. 23 is a diagram illustrating exemplary output in the second embodiment.

In generating the campaign information (s80), as illustrated in a flow of FIG. 22, the retail electric utility terminal 200 acquires, from the blockchain stored in s81, the campaign-destined commodity exchange rate information 55 containing an amount of a power taking a target date and time, a target retail store, and values of premiums α and β into consideration (s90), and sets up a predetermined template for the campaign-destined commodity exchange rate information 54 to generate campaign information 1000 (see FIG. 23) (s91). In this case, the retail electric utility terminal 200 further adds, to the campaign information, commodity promotion information 1020 (see FIG. 23) on, for example, a campaign-destined commodity previously obtained from the customer terminal 300 (s92). The retail electric utility terminal 200 then terminates the processing.

Other Embodiments

Figure 24:
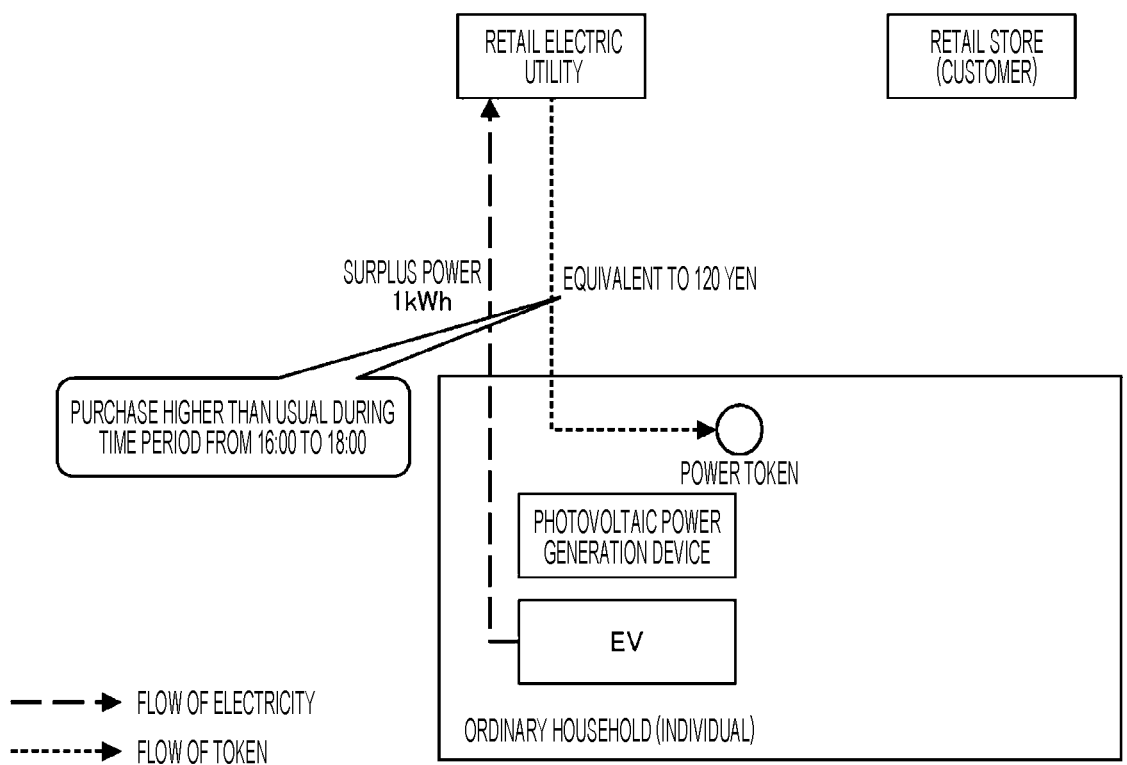
FIG. 24 is a diagram illustrating an exemplary concept of a resource accommodation assistance method according to a fourth embodiment.

Next, a description will be given of a configuration unique to a situation of the ordinary household having the electric vehicle (EV) 150 in addition to the photovoltaic power generation device 140. FIG. 24 is a diagram illustrating an exemplary concept of a resource accommodation assistance method according to a fourth embodiment.

In this case, the ordinary household is able to sell power stored in the battery of the EV 150 to the retail electric utility as surplus power in a night time period. In the case of power sale in the night time period, the retail electric utility gives a power token that is increased at a rate higher than a normal surplus power purchase rate (e.g., a power token equivalent to 120 yen per unit power consumption in the evening).

According to this configuration, the retail electric utility is able to utilize, for a power demand-supply adjustment, surplus power generated in the ordinary household even during a time period in which photovoltaic power generation is not expected.

This embodiment is similar in sequence and flow to Embodiment 2 described above, but is different from Embodiment 2 in that only a time period other than the daytime is identified as a time period in which premium-added power is sold.

With regard to an event of power sale from the ordinary household, when the timing of power sale falls within a predetermined night time period which the retail electric utility assumes in advance, the retail electric utility terminal 200 gives a power token to which a predetermined premium bearing by the retail electric utility is added.

The resource accommodation assistance system according to the present embodiment enables efficient resource accommodation between the ordinary household and the customer with a predetermined accompanying effect.

The present specification clarifies at least the followings. Specifically, in the resource accommodation assistance system according to the present embodiment, the arithmetic unit of each information processing apparatus may be configured to execute a predetermined smart contract previously held therein and to carry out a transaction for payment on the resource purchase using the payment token to which a predetermined premium bearing by the other business operator is added. According to this configuration, the smart contract efficiently enables automatically giving a payment token in accordance with the details of a transaction. This configuration thus enables efficient resource accommodation between the ordinary household and the customer with a predetermined accompanying effect.

Also in the resource accommodation assistance system according to the present embodiment, in the event of power purchase, the arithmetic unit of each information processing apparatus may be configured to execute a predetermined smart contract previously held therein, to carry out a transaction for payment on the power purchase using the payment token which the customer gains through the payment, and to store, in the distributed ledger, the transaction subjected to a predetermined process executed together with another information processing apparatus among the information processing apparatuses.

According to this configuration, in a case where the customer purchases, from the retail electric utility, surplus photovoltaic power, that is, natural energy generated in the ordinary household, the customer is able to use, as a fund for payment, a payment token gained from the ordinary household as payment for a commodity at a different opportunity. This configuration thus enables efficient resource accommodation between the ordinary household and the customer with a predetermined accompanying effect.

Also in the resource accommodation assistance system according to the present embodiment, when the ordinary household purchases a commodity, at least any of the information processing apparatuses may be configured to further execute a process of sending, to a predetermined terminal of the ordinary household, information on a campaign time period during which an extra premium higher than the premium as a default is added to the payment token, and in the event of commodity purchase, the arithmetic unit of each information processing apparatus may be configured to execute a predetermined smart contract previously held therein, to carry out, when the timing of commodity purchase falls within the campaign time period, a transaction for payment on the commodity purchase using the payment token to which a predetermined premium bearing by the customer is added as the extra premium, and to store, in the distributed ledger, the transaction subjected to a predetermined process executed together with another information processing apparatus among the information processing apparatuses.

This configuration promotes sale of surplus power from the ordinary household to the retail electric utility, based on an efficient inventory selling need in the customer that operates a store or the like, and purchase of a commodity in the store or the like by the ordinary household that obtains a premium-added payment token from the customer. This configuration thus enables efficient resource accommodation between the ordinary household and the customer with a predetermined accompanying effect.

Also in the resource accommodation assistance system according to the present embodiment, when the ordinary household sells power, at least any of the information processing apparatuses may be configured to further execute a process of sending, to a predetermined terminal of the ordinary household, information on a power demand-supply adjustment time period in which a predetermined premium bearing by the retail electric utility is added to the payment token gained through the power sale, and in the event of power sale, the arithmetic unit of each information processing apparatus may be configured to execute a predetermined smart contract previously held therein, to carry out, when the timing of power sale falls within the power demand-supply adjustment time period, a transaction for payment on the power sale using the payment token to which the predetermined premium bearing by the retail electric utility is added, and to store, in the distributed ledger, the transaction subjected to a predetermined process executed together with another information processing apparatus among the information processing apparatuses.

According to this configuration, the retail electric utility is able to efficiently purchase surplus power from the ordinary household in the time period during which power demand-supply may be (or is) stringent. This configuration therefore further promotes purchase of a commodity in the store or the like by the ordinary household that obtains a payment token to which the retail electric utility and the customer respectively add premiums. This configuration thus enables efficient resource accommodation between the ordinary household and the customer with a predetermined accompanying effect.

Also in the resource accommodation assistance system according to the present embodiment, when the ordinary household sells power, at least any of the information processing apparatuses may be configured to further execute a process of sending, to the predetermined terminal of the ordinary household, information on a predetermined night time period as the power demand-supply adjustment time period in which the predetermined premium bearing by the retail electric utility is added to the payment token gained through the power sale, and in the event of power sale, the arithmetic unit of each information processing apparatus may be configured to execute a predetermined smart contract previously held therein, to carry out, when the timing of power sale falls within the predetermined night time period, a transaction for payment on the power sale using the payment token to which the predetermined premium bearing by the retail electric utility is added, and to store, in the distributed ledger, the transaction subjected to a predetermined process executed together with another information processing apparatus among the information processing apparatuses.

According to this configuration, even in a night time period, the ordinary household is able to sell or purchase, to or from the retail electric utility, a resource as power in the power storage unit such as the electric vehicle of the ordinary household. This configuration thus achieves a resource accommodation framework that does not depend on only power, such as photovoltaic power, generated during the daytime. This configuration thus enables efficient resource accommodation between the ordinary household and the customer with a predetermined accompanying effect.

In the resource accommodation assistance method according to the present embodiment, in the event of power purchase, each information processing apparatus may be configured to execute a predetermined smart contract previously held therein, to carry out a transaction for payment on the power purchase using the payment token which the customer gains through the payment, and to store, in the distributed ledger, the transaction subjected to a predetermined process executed together with another information processing apparatus among the information processing apparatuses.

Also in the resource accommodation assistance method according to the present embodiment, when the ordinary household purchases a commodity, at least any of the information processing apparatuses may be configured to further execute a process of sending, to a predetermined terminal of the ordinary household, information on a campaign time period during which an extra premium higher than the premium as a default is added to the payment token, and in the event of commodity purchase, each information processing apparatus may be configured to execute a predetermined smart contract previously held therein, to carry out, when the timing of commodity purchase falls within the campaign time period, a transaction for payment on the commodity purchase using the payment token to which a predetermined premium bearing by the customer is added as the extra premium, and to store, in the distributed ledger, the transaction subjected to a predetermined process executed together with another information processing apparatus among the information processing apparatuses.

Also in the resource accommodation assistance method according to the present embodiment, when the ordinary household sells power, at least any of the information processing apparatuses may be configured to further execute a process of sending, to a predetermined terminal of the ordinary household, information on a power demand-supply adjustment time period in which a predetermined premium bearing by the retail electric utility is added to the payment token gained through the power sale, and in the event of power sale, each information processing apparatus may be configured to execute a predetermined smart contract previously held therein, to carry out, when the timing of power sale falls within the power demand-supply adjustment time period, a transaction for payment on the power sale using the payment token to which the predetermined premium bearing by the retail electric utility is added, and to store, in the distributed ledger, the transaction subjected to a predetermined process executed together with another information processing apparatus among the information processing apparatuses.

Also in the resource accommodation assistance method according to the present embodiment, when the ordinary household sells power, at least any of the information processing apparatuses may be configured to further execute a process of sending, to the predetermined terminal of the ordinary household, information on a predetermined night time period as the power demand-supply adjustment time period in which the predetermined premium bearing by the retail electric utility is added to the payment token gained through the power sale, and in the event of power sale, each information processing apparatus may be configured to execute a predetermined smart contract previously held therein, to carry out, when the timing of power sale falls within the predetermined night time period, a transaction for payment on the power sale using the payment token to which the predetermined premium bearing by the retail electric utility is added, and to store, in the distributed ledger, the transaction subjected to a predetermined process executed together with another information processing apparatus among the information processing apparatuses.

As illustrated in FIG. 10 or 19, alternatively, a resource accommodation assistance system according to the present invention may include: a resource seller terminal of a resource seller; a retail resource supplier terminal of a retail resource supplier that purchases a resource from the resource seller; and a customer terminal of a customer that purchases a resource from the retail resource supplier. In the resource accommodation assistance system, the resource seller terminal, the retail resource supplier terminal, and the customer terminal may communicate with one another, the retail resource supplier terminal or the customer terminal may be configured to issue a payment token for use in purchase of a commodity from the customer, in accordance with an amount of the resource purchased from the resource seller, and to transmit the payment token to the resource seller terminal, the resource seller terminal may be configured to receive the payment token issued by the retail resource supplier terminal, and the customer terminal may be configured to approve the purchase of the commodity by the resource seller using the payment token to which a predetermined premium bearing by the customer is added, and to accept the payment on the resource purchase, based on a predetermined condition.

In the resource accommodation assistance system, the resource accommodation assistance method or the resource accommodation assistance apparatus according to the present invention, a resource as a target of accommodation may be any resource (e.g., gases, fuel, personnel) in addition to electricity.

In the present embodiment, a token is exchanged with a commodity. Alternatively, a token may be exchanged with any resource in addition to a commodity. Examples of such a resource may include electricity, gas, fuel, and personnel.

The present invention is not limited to only the foregoing embodiments. The present invention may be embodied in such a manner that the constituent elements are modified within a range departing from the scope of the present invention.

REFERENCE SIGNS LIST 1 network
10 resource accommodation assistance system
50 distributed ledger
51 surplus power sale information
52 surplus power purchase information
53 issued power token information
54 commodity exchange rate information
55 campaign-destined commodity exchange rate information
100 smartphone (resource seller terminal, ordinary household terminal)
101 storage unit
102 program
103 memory
104 CPU (arithmetic unit)
105 touch panel
106 communication unit
110 surplus power sale management unit
111 transaction processing unit
130 HEMS
140 photovoltaic power generation device
150 EV (electric vehicle)
200 retail electric utility terminal (retail resource supplier terminal)
201 storage unit
202 program
203 memory
204 CPU (arithmetic unit)
205 input unit
206 output unit
207 communication unit
210 surplus power purchase management unit
211 purchase rate management unit
212 power token management unit
213 DR campaign management unit
214 transaction processing unit
230 EMS
300 customer terminal
301 storage unit
302 program
303 memory
304 CPU (arithmetic unit)
305 input unit
306 output unit
307 communication unit
310 exchange rate management unit
311 sales campaign management unit
312 transaction processing unit
330 HEMS

The invention claimed is:

1. A resource accommodation assistance system, comprising:
   a first computing node of a first entity coupled to a network;
   a second computing node of a second entity coupled to the network; and
   a third computing node of an intermediary entity coupled to the network,
   wherein each of the first computing node, the second computing node and the third computing node are configured to execute and manage transactions of a blockchain,
   wherein the first computing node is configured to issue a first transaction to the blockchain indicating a first resource sale in which the first entity sells a first resource to the intermediary entity, the first resource being electric power,
   wherein, in response to the first transaction, the first computing node is configured to receive a predetermined amount of tokens based on the first resource sold to the intermediary entity,
   wherein the second computing node is configured to issue a second transaction to the blockchain indicating a first resource purchase in which the second entity purchases the first resource which the intermediary secures through the first resource sale, wherein the first computing node is configured to issue a third transaction indicating a second resource purchase in which the first entity purchases a second resource from the second entity with the predetermined amount of tokens gained from the intermediary through the first resource sale, and wherein a smart contract deployed on the blockchain carries out a transaction for payment to the first computing node based on the first transaction meeting predetermined requirements of the smart contract, the transaction for payment including transferring the predetermined amount of tokens to the first computing node.

* * * * *